United States Patent
Oyamada

(10) Patent No.: US 7,656,820 B2
(45) Date of Patent: Feb. 2, 2010

(54) DATA TRANSMISSION APPARATUS CAPABLE OF DIVIDING NETWORK AREAS

(75) Inventor: Hisashi Oyamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 480 days.

(21) Appl. No.: 11/371,556

(22) Filed: Mar. 9, 2006

(65) Prior Publication Data

US 2007/0070920 A1 Mar. 29, 2007

(30) Foreign Application Priority Data

Sep. 29, 2005 (JP) ............................. 2005-285373

(51) Int. Cl.
*H04L 12/28* (2006.01)
(52) U.S. Cl. .................................................. 370/254
(58) Field of Classification Search .......... 370/250–260
See application file for complete search history.

(56) References Cited

U.S. PATENT DOCUMENTS

| 4,864,559 | A | * | 9/1989 | Perlman ...................... 370/256 |
| 5,497,368 | A | | 3/1996 | Reijnierse et al. |
| 6,229,791 | B1 | * | 5/2001 | Nusekabel et al. .......... 370/252 |
| 2002/0018447 | A1 | | 2/2002 | Yamada et al. |
| 2004/0174829 | A1 | * | 9/2004 | Ayyagari ..................... 370/254 |

FOREIGN PATENT DOCUMENTS

| EP | 0 639 911 | 2/1995 |
| EP | 1 187 400 | 3/2002 |
| JP | 8-32620 | 2/1996 |
| JP | 2002-57697 | 2/2002 |

OTHER PUBLICATIONS

Eriksson, et al, Scalable Ad Hoc Routing: The Case for Dynamic Addressing, Mar. 2004, IEEE, Infocom 2004, pp. 1108-1119.*

* cited by examiner

*Primary Examiner*—Pankaj Kumar
*Assistant Examiner*—Gautam Sharma
(74) *Attorney, Agent, or Firm*—Fujitsu Patent Center

(57) ABSTRACT

A transmission apparatus that automatically makes area division on the basis of a predetermined condition to lessen the labor of a maintainer. Transmission apparatus $1a, \ldots, 1m, \ldots$ make up one area. Each of the transmission apparatus $1a, \ldots, 1m, \ldots$ transmits data in the area or between areas according to its level. The transmission apparatus $1a, \ldots, 1m, \ldots$ select the transmission apparatus $1h$ as a network leader in the area. The transmission apparatus $1h$ calculates division points at which the area is to be divided on the basis of the predetermined condition. The transmission apparatus $1h$ selects the transmission apparatus $1a$ and $1b$ adjacent to one of the division points as area group leaders. Each of the transmission apparatus $1a$ and $1b$ changes its level so as to be able to transmit data between a new area formed as a result of division and an existing area. The transmission apparatus $1a, \ldots, 1m, \ldots$ transmit data between the new area and the existing area via the transmission apparatus $1a$ and $1b$ selected as area group leaders.

13 Claims, 27 Drawing Sheets

FIG. 3

| PDU ID | PDU NAME | SENDER AND RECEIVER OF PDU | ACK | NAME (SIZE) OF FIELD INCLUDED IN PDU | USE |
|---|---|---|---|---|---|
| 1 | PRIORITY NOTIFICATION PDU | REGULAR FLOODING | NO | 1. PRIORITY VALUE (1byte) 2. SYSID (6byte) | PROPAGATED IN NETWORK AND USED FOR SELECTING NL |
| 2 | NL SELECTION PDU | FLOODING FROM APPARATUS WHICH DETERMINES THAT IT IS NL | YES | FLAG (1 BYTE) INDICATIVE OF WHETHER NL IS AUTOMATICALLY SELECTED OR WHETHER NL IS MANUALLY SET BY USER | DECLARE IN NETWORK THAT THE APPARATUS OPERATES AS NL. AN NL SELECTION PDU INCLUDING A FLAG INDICATIVE THAT THE NL IS AUTOMATICALLY SELECTED PRECEDES AN NL SELECTION PDU INCLUDING A FLAG INDICATIVE THAT THE NL IS MANUALLY SET BY A MAINTAINER. |
| 3 | MANUAL NL RELEASE PDU | FLOODING FROM NL | YES | NO | RELEASE NL MANUALLY SET. AFTER THIS PDU IS RECEIVED, AUTOMATIC NL SELECTION IS MADE. |
| 4 | REGULAR TRAFFIC VOLUME NOTIFICATION PDU | SENT FROM EACH APPARATUS TO NL | NO | NO | REGULARLY INFORM NL OF TRAFFIC BETWEEN EACH APPARATUS AND APPARATUS CONNECTED THERETO |
| 5 | AREA DIVISION START PDU | FLOODING FROM NL | YES | NO | WHEN THIS PDU IS RECEIVED, THE NL IS FIXED. EACH APPARATUS GOES INTO AN AREA DIVISION PROCESSING STATE. AN AREA DIVISION START PDU THE TIME STAMP OF WHICH IS THE OLDEST PRECEDES ALL OTHERS. THE NL RESENDS THIS PDU TO AN APPARATUS FROM WHICH THE NL CANNOT RECEIVE ACK. THE NL CONTINUES THIS OPERATION UNTIL THE NL RECEIVES ACK FROM THE APPARATUS. |

| | | | | | |
|---|---|---|---|---|---|
| 6 | AGL NOTIFICATION PDU | SENT FROM NL TO AGLS | YES | NO | NL SELECTS AGLS AND SENDS THIS PDU TO THE AGLS. |
| 7 | AREA GROUPING INFORMATION PDU | FLOODING FROM NL | YES | 1. LIST OF PAIRS OF SYS ID (6 BYTES) OF EACH APPARATUS IN THE NETWORK AND A NEW AREA ADDRESS (13 BYTES) ASSIGNED | PROPAGATED IN THE NETWORK AND USED FOR SELECTING THE NL |
| 8 | AREA DIVISION COMMAND PDU | SENT FROM NL TO AGLS | YES | NEW AREA ADDRESS VALUE | ON THE BASIS OF AREA GROUPING INFORMATION, AN AGL WHICH SUPPORTS THE START OF AREA DIVISION SETS A MANUAL AREA ADDRESS, SETS A NEW AREA ADDRESS, AND CHANGES ITS SYSTEM TYPE TO THE LEVEL-ONE/TWO APPARATUS. |
| 9 | AREA ADDRESS CHANGE COMMAND PDU | FLOODING FROM AGL TO ALL OF GROUPED APPARATUS IN AREA | YES | NO | THE AGL SENDS AN AREA ADDRESS CHANGE COMMAND PDU TO APPARATUS IN ASCENDING ORDER OF THE DISTANCE FROM THE AGL FROM THE VIEWPOINT OF TOPOLOGY. EACH APPARATUS WHICH RECEIVES THIS PDU SETS THE MANUAL AREA ADDRESS AND CHANGES ITS AREA ADDRESS. |
| 10 | SESSION CONTINUATION CONFIRMATION PDU | SENT AT EACH STAGE FROM EACH APPARATUS WHICH HAS PERFORMED A PROCESS, SUCH AS CHANGING AN ADDRESS, TO THE AGL | NO | NO | INFORM WHETHER COMMUNICATION IS CONTINUED OVER EXISTING SESSION |
| 11 | COMMUNICATION PATH ADDRESS CHANGE REQUEST PDU | SENT FROM EACH APPARATUS TO APPARATUS WITH WHICH IT HAS ESTABLISHED A SESSION | YES | NO | REQUEST APPARATUS AT OTHER END IN EXISTING SESSION TO CHANGE ADDRESS |

FIG. 4

| | | | | |
|---|---|---|---|---|
| 12 | MANUAL AREA ADDRESS DELETION PDU | SENT FROM AGL TO EACH APPARATUS | YES | NO | THE AGL SENDS A MANUAL AREA ADDRESS DELETION PDU TO APPARATUS IN ASCENDING ORDER OF THE DISTANCE FROM THE AGL FROM THE VIEWPOINT OF TOPOLOGY. EACH APPARATUS WHICH RECEIVES THIS PDU DELETES THE MANUAL AREA ADDRESS. |
| 13 | AREA DIVISION COMPLETION NOTIFICATION PDU | SENT FROM AGL TO NL | | NO | THE AGL SENDS THE NL AN AREA DIVISION COMPLETION NOTIFICATION PDU TO INFORM THAT THE AREA DIVISION PROCESS IS COMPLETED. THE NL WHICH RECEIVES THIS PDU PROPAGATES AN AREA DIVISION END PDU IN THE NETWORK. |
| 14 | AREA DIVISION ENDING PDU | | | NO | EACH APPARATUS WHICH RECEIVES THIS PDU GOES INTO A NORMAL STATE. |
| 15 | AREA ADDRESS REQUEST PDU | | YES | NO | INQUIRE AREA ADDRESS. ACK INCLUDES AREA ADDRESS INFORMATION TO BE SET. |

FIG. 5

| NE | ADJACENT NE | RING FORMATION | DIRECTION | TRAFFIC |
|---|---|---|---|---|
| NE-1 | NE-2 | R1 | → | 2 |
| | | | ← | 2 |
| | NE-10 | R1 | → | 2 |
| | | | ← | 24 |
| | NE-16 | | → | 2 |
| | | | ← | 2 |
| | NE-20 | R2 | → | 2 |
| | | | ← | 2 |
| NE-2 | NE-3 | R1 | → | 2 |
| | | | ← | 2 |
| | NE-1 | R1 | → | 2 |
| | | | ← | 2 |
| NE-3 | NE-2 | R1 | → | 2 |
| | | | ← | 2 |
| | NE-21 | R1 | → | 2 |
| | | | ← | 2 |
| NE-4 | NE-5 | R1 | → | 2 |
| | | | ← | 2 |
| | NE-21 | R1 | → | 2 |
| | | | ← | 2 |
| NE-5 | NE-4 | R1 | → | 2 |
| | | | ← | 2 |
| | NE-6 | | → | 2 |
| | | | ← | 2 |
| | NE-9 | R1 | → | 6 |
| | | | ← | 2 |

FIG. 7

| | | ⌐42 | | |
|---|---|---|---|---|
| NE-6 | NE-5 | | → | 4 |
| | | | ← | 2 |
| | NE-7 | | → | 2 |
| | | | ← | 2 |
| NE-7 | NE-6 | | → | 2 |
| | | | ← | 2 |
| | NE-8 | | → | 2 |
| | | | ← | 2 |
| NE-8 | NE-7 | | → | 2 |
| | | | ← | 2 |
| NE-9 | NE-5 | R1 | → | 2 |
| | | | ← | 2 |
| | NE-11 | R1 | → | 8 |
| | | | ← | 2 |
| NE-10 | NE-1 | R1,R2 | → | 2 |
| | | | ← | 2 |
| | NE-11 | R1,R2 | → | 2 |
| | | | ← | 2 |
| NE-11 | NE-9 | R1 | → | 2 |
| | | | ← | 8 |
| | NE-10 | R1,R2 | → | 20 |
| | | | ← | 4 |
| | NE-12 | R2 | → | 2 |
| | | | ← | 10 |
| NE-12 | NE-11 | R2 | → | 10 |
| | | | ← | 2 |
| | NE-13 | R2 | → | 2 |
| ⋮ | ⋮ | ⋮ | ⋮ | ⋮ |

FIG. 8

| AREA ADDRESS | SystemID | SEL |
|---|---|---|
| 39840F8000000000000000000 | 00000E3A0000 | 00 |

FIG. 24

DATA TRANSMISSION APPARATUS CAPABLE OF DIVIDING NETWORK AREAS

CROSS-REFERENCE TO RELATED APPLICATIONS

This application is based upon and claims the benefits of priority from the prior Japanese Patent Application No. 2005-285373, filed on Sep. 29, 2005, the entire contents of which are incorporated herein by reference.

BACKGROUND OF THE INVENTION (1) Field of the Invention

This invention relates to a transmission apparatus and, more particularly, to a transmission apparatus for transmitting data in an area and between areas according to a level.

(2) Description of the Related Art

With optical communication networks for realizing large-capacity communication, usually a wide area is dotted with a large number of transmission apparatus. For example, transmission apparatus used on a synchronous optical network (SONET) in North America are located so as to link chief cities in North America. Such transmission apparatus are remotely controlled by, for example, a centralized control center via a network. With SONET, an area in a SONET overhead called data communication channel (DCC) bytes is used for exchanging data between a centralized control center and each transmission apparatus.

FIGS. 22A, 22B, and 22C are views for describing a SONET frame. With SONET, as shown in FIG. 22A, nine pieces of data each including a 3-byte header and 87-byte data are exchanged in a period of 125 μsec. These nine pieces of data are recognized as one piece of data and, as shown in FIG. 22B, an overhead and a payload are recognized. The overhead can be divided into a section overhead (SOH) and a line overhead (LOH). A manager in a centralized control center controls a transmission apparatus in a remote area via a transmission apparatus in the centralized control center. Supervisory control information is exchanged between the transmission apparatus in the centralized control center and the transmission apparatus in the remote area by using an area in the section overhead called the DCC bytes shown in FIG. 22C.

The transmission apparatus in the centralized control center and the transmission apparatus in the remote area communicate with each other by designating a protocol stack corresponding to the OSI reference model in this DCC-byte area. FIG. 23 shows an example of a protocol stack for a centralized control center and a transmission apparatus. As shown in FIG. 23, a communication protocol for a centralized control center and a transmission apparatus can be divided into the layers in the OSI reference model. A manager in the centralized control center who manages the transmission apparatus controls the transmission apparatus by sending and receiving a command language called TL1 at the application layer.

The intermediate system to intermediate system (IS-IS) protocol is at the network layer in the OSI reference model. The IP protocol is famous as a protocol at the network layer. With the IP protocol, an IP address is used for specifying a destination and selecting a route to the destination. With the IS-IS protocol, on the other hand, a network service access point (NSAP) address is used for specifying a destination and selecting a route to the destination.

FIG. 24 is a view for describing an NSAP address. As shown in FIG. 24, an NSAP address can be divided into an area address, a system ID (SYSID), and SEL. If the area addresses of transmission apparatus are the same, then they are referred to as "being in the same area". If these transmission apparatus exist in the same area, then they directly exchange data. This routing is referred to as level-one routing and an apparatus which handles level-one routing is referred to as a level-one apparatus.

On the other hand, transmission apparatus the area addresses of which are different communicate with each other via an apparatus referred to as a level-two apparatus. Usually a level-two apparatus belongs to an area and can also handle level-one routing. Accordingly, a level-two apparatus is referred to as a level-one/two apparatus. When a first transmission apparatus, being a level-one apparatus, sends data to a second transmission apparatus which is a level-one apparatus and which is in another area, the first transmission apparatus must request a transmission apparatus which is a level-one/two apparatus and which belongs to the same area to transmit the data.

By the way, the number of transmission apparatus which are level-one apparatus and which can exist in the same area (the number of transmission apparatus which can handle level-one routing) depends on the size of a routing table each transmission apparatus can hold and therefore on the capacity of a memory included in each transmission apparatus. That is to say, there is a limit to the number of transmission apparatus which can belong to the same level-one routing area. If this limit is reached, a new transmission apparatus cannot be connected to a network. For example, if a new transmission apparatus is connected by mistake, level-one routing is not applied to this new transmission apparatus. To avoid this problem, a second area is newly formed and this transmission apparatus is connected in the new area as a level-one apparatus.

FIGS. 25A and 25B are views for describing an example of the case where a second area is newly formed and where a new level-one apparatus is connected. In FIGS. 25A and 25B, network elements (NEs) 101, 102, and 111, being transmission apparatus, and a network 103 are shown. It is assumed that the network 103 includes a plurality of network elements.

In an existing area 100 shown in FIG. 25A, the number of NEs connected has reached a limit. It is assumed that a new NE 111 is connected in the existing area 100. In this case, as shown in FIG. 25B, the NEs 101 and 102 are changed to level-one/two apparatus first. An area address of the NE 102 is then changed to a new area address. The new area address is set for the NE 111 and the NE 111 is connected to the NE 102. As stated above, if the number of NEs in the routing area has reached the limit, a second area is newly formed and the new NE 111 is connected in the second area. By doing so, a new NE can be connected.

To connect a second NE in a new area after area division, a new area address should be set in advance for the NE before connection.

FIG. 26 is a view for describing the case where an NE is connected in a new area. In FIG. 26, an existing area 130 and a new area 131 separated from the existing area 130 are shown. The existing area 130 includes an NE 141 and a network 142. The new area 131 includes NEs 143 and 144. To connect a new NE 145 in the new area 131 after the area division, an area address of the new area 131 must be set in advance for the NE 145.

If traffic concentrates at part of NEs because of, for example, an improper network design, throughput deteriorates. For example, if part of connection forms a ring, such a state may arise at an NE which is at a position, such as a hub, in an area. In such a case, it is necessary to review the network design and make an adjustment by, for example, area division.

By doing so, proper traffic can be realized. In many cases, such deterioration in throughput due to, for example, a network design goes unnoticed until a concrete phenomenon (unstable communication, for example) occurs. When a change in area is made, a communication path which has already connected must be disconnected once because a destination is changed to another area. Connection must be made again to a new area address. Accordingly, while area division is being made, NE supervision must temporarily be stopped.

FIG. 27 is a view for describing area division. In FIG. 27, NEs 151 and 152 and networks 153 and 154 are shown. It is assumed that an area is divided at a division point C shown in FIG. 27 because of traffic concentration. In this case, the NE 151 in an existing area and the NE 152 which belongs to a new area as a result of the area division adjacent to the area division point C are changed to level-one/two apparatus. An area address of the NE 152 is changed to a new area address. The new area address is set for each NE in the new area. As a result, data transfer can be performed between the existing are and the new area.

A routing method and a hierarchical communication network which significantly improve routing for efficiently utilizing a communication network have conventionally been proposed (see, for example, Japanese Patent Laid-Open Publication No. Hei8-32620). In addition, a packet transfer path control apparatus which can secure the scalability and stability of routing handling by linking routers in parallel without the current link state routing handling section being changed has been proposed (see, for example, Japanese Patent Laid-Open Publication No. 2002-57697).

With the conventional area division, however, a maintainer recognizes when to make area division, determines how to divide an area, and manually performs setting and the like. This requires much labor.

SUMMARY OF THE INVENTION

The present invention was made under the background circumstances described above. An object of the present invention is to provide a transmission apparatus which lessens the labor of a maintainer by automatically making area division on the basis of a predetermined condition.

In order to achieve the above object, a transmission apparatus for transmitting data in an area or between areas according to a level is provided. This transmission apparatus comprises a division point calculation section for calculating division points where an area to which the transmission apparatus belongs is to be divided on the basis of a predetermined condition; an area group leader selection section for selecting transmission apparatus adjacent to one of the division points as area group leaders; a level change section for changing, in the case of being selected as the area group leader, the level so as to be able to transmit the data between a new area formed as a result of division and an existing area; and a data transmission section for transmitting the data between the new area and the existing area via the transmission apparatus selected as the area group leaders.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 shows a list of PDUs included in an AISP.

FIG. 4 shows a list of PDUs included in the AISP.

FIG. 5 shows a list of PDUs included in the AISP.

FIG. 7 shows an example of the data structure of a network topology and traffic management table.

FIG. 8 shows an example of the data structure of the network topology and traffic management table.

FIG. 24 is a view for describing an NSAP address.

DESCRIPTION OF THE PREFERRED EMBODIMENTS

Figure 1:
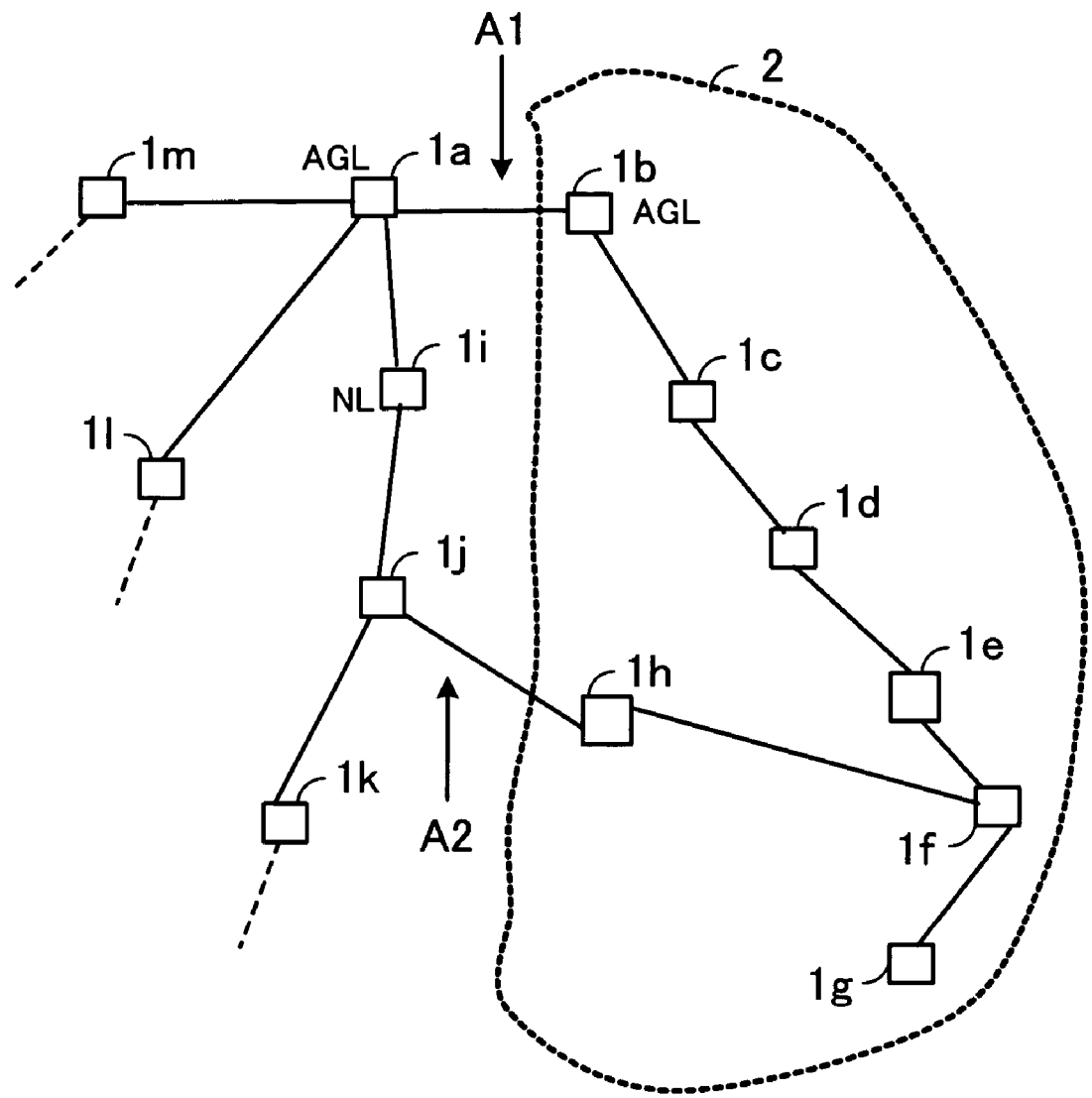
FIG. 1 is a view for giving an overview of a transmission apparatus according to the present invention and a network to which the transmission apparatus is applied.

The principles underlying the present invention will now be described in detail with reference to the drawing.

FIG. 1 is a view for giving an overview of a transmission apparatus according to the present invention and a network to which the transmission apparatus is applied. As shown in FIG. 1, transmission apparatus 1a, ..., 1m, ... make up an area. Each of the transmission apparatus 1a, ..., 1m, ... comprises a network leader selection section for selecting a network leader in the area, a division point calculation section for calculating, in the case of being selected as the network leader, division points at which the area is to be divided on the basis of a predetermined condition, an area group leader selection section for selecting, in the case of being selected as the network leader, transmission apparatus adjacent to one of the division points as area group leaders, a level change section for changing, in the case of being selected as the area group leader, a level so as to be able to transmit data between a new area formed as a result of division and an existing area obtained by excluding the new area from the area before the division, and a data transmission section for sending the data to be transmitted between the new area and the existing area via the transmission apparatus selected as the area group leaders. However, these sections are not shown.

The network leader selection section included in each of the transmission apparatus 1a, . . . , 1m, . . . selects one network leader (NL) in the area. In FIG. 1, it is assumed that the transmission apparatus 1j is selected as a network leader.

The division point calculation section included in the transmission apparatus 1j selected as an NL calculates division points at which the area is to be divided on the basis of a predetermined condition. Traffic handled by the transmission apparatus 1a, . . . , 1m, . . . is included in the predetermined condition. When traffic handled by the transmission apparatus in the area exceeds a threshold, the division point calculation section calculates division points to reduce the traffic. The number of the transmission apparatus in the area is also included in the predetermined condition. When the number of the transmission apparatus in the area exceeds a threshold, the division point calculation section divides the area so that half of the transmission apparatus will be in each area. In FIG. 1, it is assumed that division points A1 and A2 are calculated.

The area group leader selection section included in the transmission apparatus 1j selected as an NL selects the transmission apparatus 1a and 1b adjacent to one (the division point A1, in this example) of the division points A1 and A2 as area group leaders (AGLs).

The level change section included in each of the transmission apparatus 1a and 1b selected as AGLs changes each of the transmission apparatus 1a and 1b to a level-one/two apparatus so as to be able to transmit data between a new area 2 formed as a result of the division and an existing area. In FIG. 1, the transmission apparatus 1b through 1h make up the new area 2 and the existing area (made up of the transmission apparatus 1a, 1i, . . . , 1m, . . . ) is obtained by excluding the new area 2 from the area before the division.

The data transmission section included in each of the transmission apparatus 1a, . . . , 1m, . . . sends the data to be transmitted between the new area 2 and the existing area via the transmission apparatus 1a and 1b. As a result, a communication path between the transmission apparatus 1j and 1h is disconnected.

As stated above, an NL is selected in the area. The transmission apparatus selected as an NL calculates the division points at which the area is to be divided on the basis of the predetermined condition. The transmission apparatus adjacent to a division point are selected as AGLs. Each of the transmission apparatus selected as AGLs makes a change in level so as to be able to transmit the data between the new area formed as a result of the division and the existing area. Each transmission apparatus sends the data to be transmitted between the new area and the existing area via the transmission apparatus selected as AGLs. As a result, area division is automatically made on the basis of the predetermined condition and the labor of a maintainer can be lessened.

An embodiment of the present invention will now be described in detail with reference to the drawing.

Figure 2:
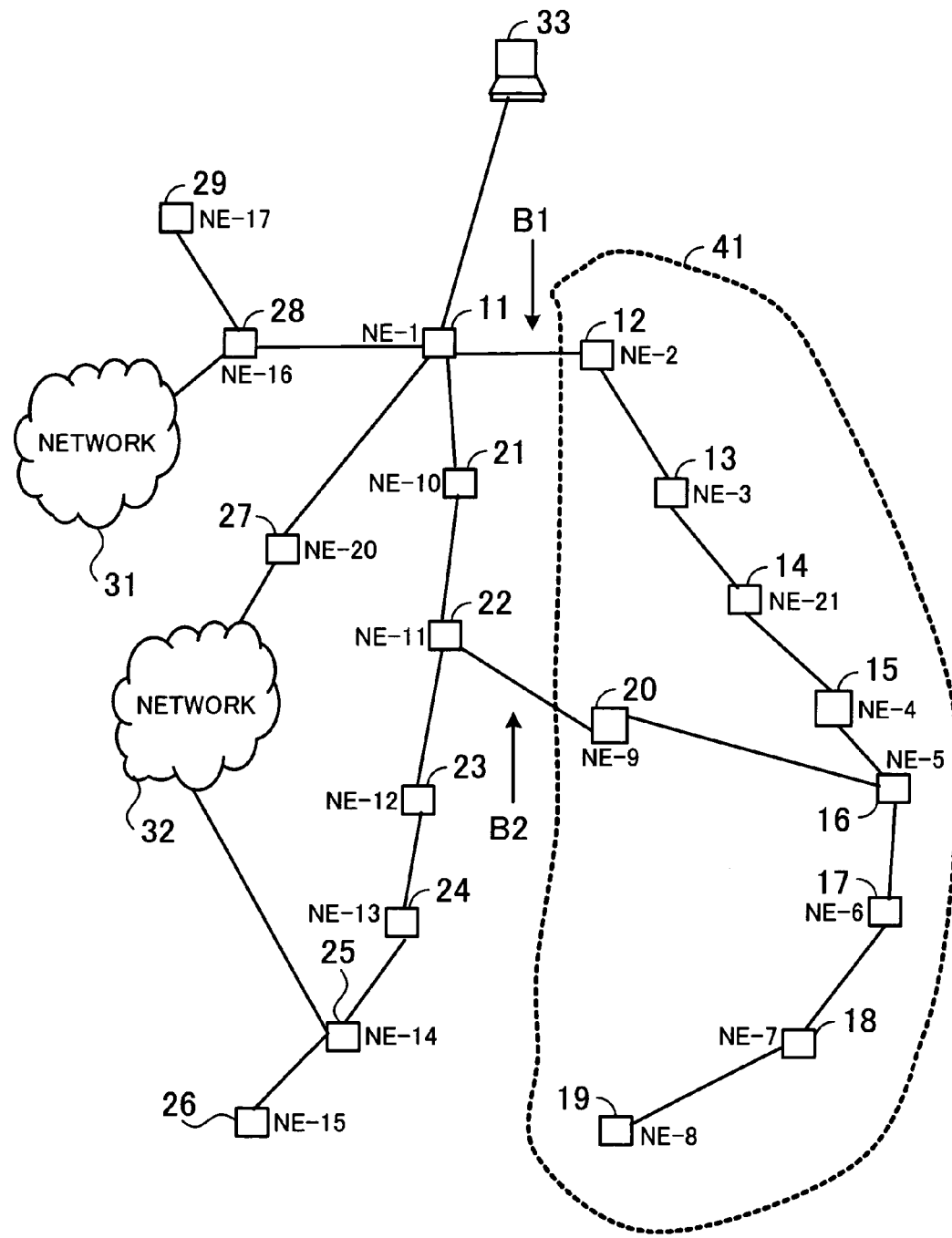
FIG. 2 shows an example of an area made up of transmission apparatus.

FIG. 2 shows an example of an area made up of transmission apparatus. As shown in FIG. 2, NEs 11 through 29, networks 31 and 32, and a management unit 33 are connected and make up an area. NE-1 through NE-21 shown in FIG. 2 indicate names given to the NEs 11 through 29, respectively, as identifiers. The NEs 11 through 29, the networks 31 and 32, and the management unit 33 use an area in a SONET overhead called the DCC bytes for exchanging one another's information, such as supervisory control information.

On the basis of a new protocol (automatic IS-IS area division protocol hereinafter referred to as the "AISP") set at a layer higher than the IS-IS protocol (which is included in the network layer), the NEs 11 through 29 and NEs which make up the networks 31 and 32 exchange one another's information, find an opportunity of autonomously making area division, and make area division. For example, it is assumed that traffic at the NE 22 shown in FIG. 2 exceeds a predetermined threshold. In this case, as shown in FIG. 2, the area is divided to form a new area 41 and the NEs 11 and 12 are made level-one/two apparatus. Data is transmitted between an NE in the existing area and an NE in new area 41 via the NEs 11 and 12. That is to say, an NE in new area 41 formed as a result of the division and an NE in the existing area communicate with each other via the NEs 11 and 12. As a result, a direct communication path between the NEs 20 and 22 is disconnected and the traffic at the NE 22 is reduced.

The AISP which is used for automatically making area division and which is set at the layer higher than the IS-IS protocol will now be described.

FIGS. 3 through 5 show a list of protocol data units (PDUs) included in the AISP. With the AISP, area division is made by using the PDUs shown in FIGS. 3 through 5. NL's in FIGS. 3 through 5 mean an NE selected as a leader in an area. AGL's mean an NE adjacent to an area division point calculated. flooding's mean that the same information is transmitted in the area and that the same information is shared by all NEs in the area. ACK's mean a response message from the other end. Each PDU includes a rollback flag (not shown). If a rollback flag is designated, a process which has been performed is canceled to return to an original state. That is to say, if an abnormality occurs during an area division process, the area division process is canceled in order to return to the original state. The details of the contents of each PDU will be described in the area division operation given later.

The format of a PDU will now be described.

Figure 6:
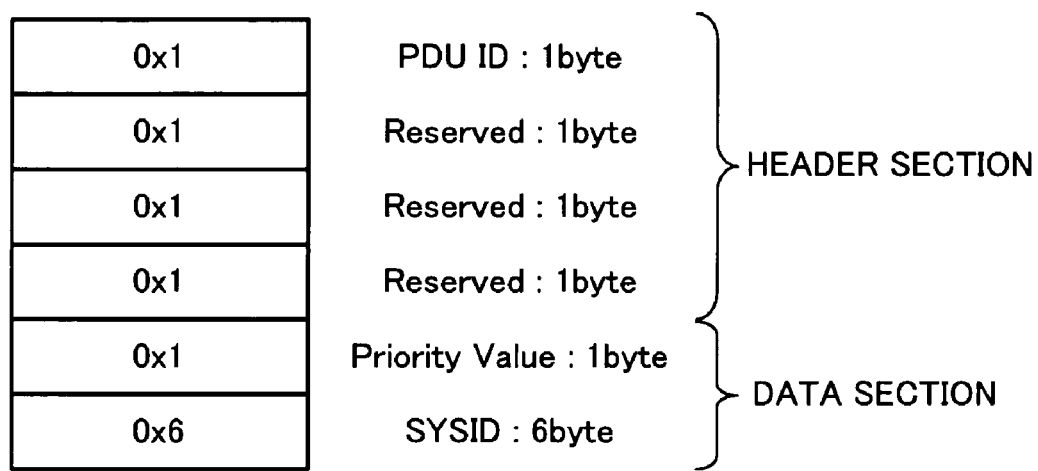
FIG. 6 shows the format of a PDU.

FIG. 6 shows the format of a PDU. As shown in FIG. 6, a PDU is divided into a header section and a data section. The header section stores a PDU ID (shown in FIG. 3, 4, or 5) for indicating the structure of the data section. The data section stores data corresponding to the PDU. In this example, the format of the priority notification PDU in FIG. 3 is shown. Each of the other PDUs is also divided into a header section and a data section. The header section stores a PDU ID (shown in FIG. 3, 4, or 5) and the data section stores data corresponding to each PDU.

An example of the data structure of a network topology and traffic management table created by an NL will now be described.

FIGS. 7 and 8 show an example of the data structure of a network topology and traffic management table. A network topology and traffic management table 42 shown in FIGS. 7 and 8 manages information regarding network topology and traffic in the area structure shown in FIG. 2. The network topology and traffic management table 42 is shown in FIGS. 7 and 8, but FIGS. 7 and 8 make up one table. In the network topology and traffic management table 42, NE-12 through NE-21 are omitted.

The network topology and traffic management table 42 includes NE, Adjacent NE, Ring Formation, Direction, and Traffic columns. The name of an NE included in the area is stored in the NE column. The name of an NE adjacent to the NE stored in the NE column is stored in the Adjacent NE column. For example, in FIG. 2, NE-2, NE-10, NE-16, and NE-20 are adjacent to NE-1. Accordingly, as shown in FIG. 7, NE-2, NE-10, NE-16, and NE-20 are stored in the Adjacent NE column corresponding to the NE column where NE-1 is stored.

The name of a ring formed by NEs is stored in the Ring Formation column. For example, in FIG. 2, NE-1, NE-2, NE-3, NE-21, NE-4, NE-5, NE-9, NE-11, and NE-10 form a ring. NE-1, NE-10, NE-11, NE-12, NE-13, NE-14, and NE-20 form a ring. It is assumed that the names of these rings are R1 and R2. For example, as shown in FIG. 7, R1 is stored in the Ring Formation column corresponding to the NE column where NE-1 is stored and the Adjacent NE column where NE-2 is stored. R2 is stored in the Ring Formation column corresponding to the NE column where NE-1 is stored and the Adjacent NE column where NE-20 is stored. The Ring Formation column corresponding to the NE column where NE-1 is stored and the Adjacent NE column where NE-16 is stored is blank because NE-1 and NE-16 do not form a ring.

The direction of data exchanged between NEs is stored in the Direction column. Data traffic in each direction is stored in the Traffic column. For example, as can be seen from FIG. 7, traffic from NE-1 to NE-2 is 2 and traffic from NE-2 to NE-1 is also 2.

In FIG. 7, the direction from NE-1 to NE-2 is indicated by an arrow which points in the right direction, and the direction from NE-2 to NE-1 is indicated by an arrow which points in the left direction. However, numeric values which are easy to handle may actually be used for indicating directions. For example, "0" is assigned to the direction from NE-1 to NE-2 and "1" is assigned to the direction from NE-2 to NE-1.

Automatic area division operation in FIG. 2 will now be described. Automatic area division is started when the number of NEs which are level-one apparatus and which are connected in an area exceeds a threshold or when traffic at an NE exceeds a predetermined volume. Automatic area division operation performed when traffic at an NE exceeds a predetermined volume will be described first.

1. First, each of NE-1 through NE-21 in the same area sends a priority notification PDU regularly. A priority value given in advance to each of NE-1 through NE-21 is stored in a priority notification PDU. Each of NE-1 through NE-21 holds priority values stored in priority notification PDUs sent from NE-1 through NE-21. Each of NE-1 through NE-21 compares its priority value with the priority values it holds. If its priority value is the greatest, then it recognizes that it is selected as an NL. An NE which recognizes that it is selected as an NL informs each NE by an NL selection PDU that it is selected as an NL. In FIG. 2, it is assumed that a priority value given to NE-1 is the greatest and that NE-1 is selected as an NL.

2. Each NE which is not selected as an NL regularly sends a regular traffic volume notification PDU including its traffic information to the NL. The NL creates the network topology and traffic management table 42 shown in FIGS. 7 and 8 from the regular traffic volume notification PDU received from each NE and network topology information (included in Hello or LSP in the existing IS-IS protocol).

To reduce traffic at an NE where a traffic volume is high, the NL calculates division points at which the area is to be divided on the basis of the network topology and traffic management table 42. For example, as can be seen from the network topology and traffic management table 42 shown in FIGS. 7 and 8, a traffic volume is high at NE-11. Accordingly, the current area made up of NE-1 through NE-21 and the networks 31 and 32 is divided to form the new area 41. By doing so, NE-9 is disconnected from NE-11 and the traffic volume at NE-11 is reduced. That is to say, in this case, a division point (B1 in FIG. 2) between NE-1 and NE-2 and a division point (B2 in FIG. 2) between NE-11 and NE-9 are calculated. The details of the method for calculating area division points will be described later.

3. The NL selects an NE in each area adjacent to one of the division points B1 and B2 as an AGL and sends an AGL notification PDU. In this case, NE-1 and NE-2 on both sides of the division point B1 are selected as AGLs. If NE-11 and NE-9 on both sides of the division point B2 are selected as AGLs, traffic at NE-11 cannot be reduced. That is to say, AGLs are selected so that traffic will be reduced. In this example, NE-1 is selected as an NL and an AGL. However, it is a matter of course that an NE selected as an NL may differ from an NE selected as an AGL.

Next, the NL requests the AGLs by an area division command PDU to start area division. The area division command PDU includes a new area address value of the new area. This new area address is automatically determined by the NL so that it will not be the same as another area address. For example, a value obtained by adding one to an area address of the existing area before the division is used as the new area address.

4. Each AGL which received the area division command PDU changes its system type to the level-one/two apparatus.

5. The AGL in the new area changes its area address to the new area address. At the same time the AGL in the new area sets the area address (former area address) of the area to which the AGL belonged before as a manual area address. If the former area address is set as the manual area address, the AGL can also send or receive data by using the former area address. Setting a manual area address is included in the general function of the IS-IS protocol.

6. The NL calculates the division points, so the NL can recognize NEs which belong to the existing area and NEs which belong to the new area. Therefore, the NL sends each NE information indicative of the NEs which belong to the existing area and the NEs which belong to the new area by an area grouping information PDU. To be concrete, the NL sends the NEs including the AGLs information including SYS ID information for the NEs which belong to the new area or the existing area and the new area address newly assigned. On the basis of the contents of the area grouping information PDU, each NE can recognize not only an area to which it belongs but also an area to which an NE at the other end belongs.

7. The AGL sends an area address change command PDU to NEs which need a change to the new area address in ascending order of the distance from the AGL from the viewpoint of topology. That is to say, the AGL sends an area address change command PDU to an NE which belong to the new area. The NE which receives the area address change command PDU changes its area address and sets the manual area address. The NE can exchange data by using both the new area address and the manual area address. Accordingly, the NE which has established a session at the beginning of the division can exchange data by using the former area address.

8. The NE which has established a session at the beginning of the division sends the AGL a session continuation confirmation PDU in order to inform the AGL that communication can be continued over the existing session by setting the manual area address.

9. The NE which receives the area address change command PDU sends a communication path address change request PDU to an NE at the other end in the existing session (NE with which it has established the existing session) in order to make a request for a change to the new area address.

10. The NE which receives the communication path address change request PDU recognizes from the area grouping information that the NE with which it has established the session shifts to the new area, and rewrites NSAP address information in a communication path management table where session information is stored. At the same time information in TARP-CACHE where information obtained by the protocol TARP is stored is updated.

Usually an NE has the name TID when it communicates by using a communication protocol included in the OSI reference model. The protocol TARP is used for inquiring the relationship between TID and an NSAP address. The NE records the relationship between TID and the NSAP address once inquired in the TARP-CACHE. However, if area division is made, the NSAP address in the TARP-CACHE must be changed. The destination area address is changed, so communication is begun via a level-two apparatus.

The NE which receives the communication path address change request PDU returns ACK to the NE which sent the communication path address change request PDU.

11. The NE which receives the ACK sends the AGL a session continuation confirmation PDU in order to inform the AGL that a session can be continued by the new area address (level-two routing). After the AGL receives the session continuation confirmation PDU, the AGL sends an area address change command PDU to an NE which is the next closest to the AGL from the viewpoint of topology.

12. The processes in items 7 through 11 are performed on all the NEs.

13. The AGL sends each NE a manual area address deletion PDU to delete the manual area address.

14. Each NE which receives the manual area address deletion PDU deletes the manual area address.

15. Each NE which deleted the manual area address sends the AGL a session continuation confirmation PDU in order to inform the AGL that a session can be continued even after the deletion of the manual area address.

16. After all the NEs perform the process in item 15, the AGL sends the NL an area division completion notification PDU to inform that the area division ends. When the NL receives the area division completion notification PDU, the NL sends each NE an area division end PDU. Each NE changes from an area division processing state to a normal communication state when it receives the area division end PDU. The automatic area division is made in this way.

In the above item 4, only the AGL in the existing area may be changed to a level-one/two apparatus. In this case, only one port that is connected to the new area should be operated by using the area address of the new area (this is referred to as a multi-area IS-IS function).

Figure 9:
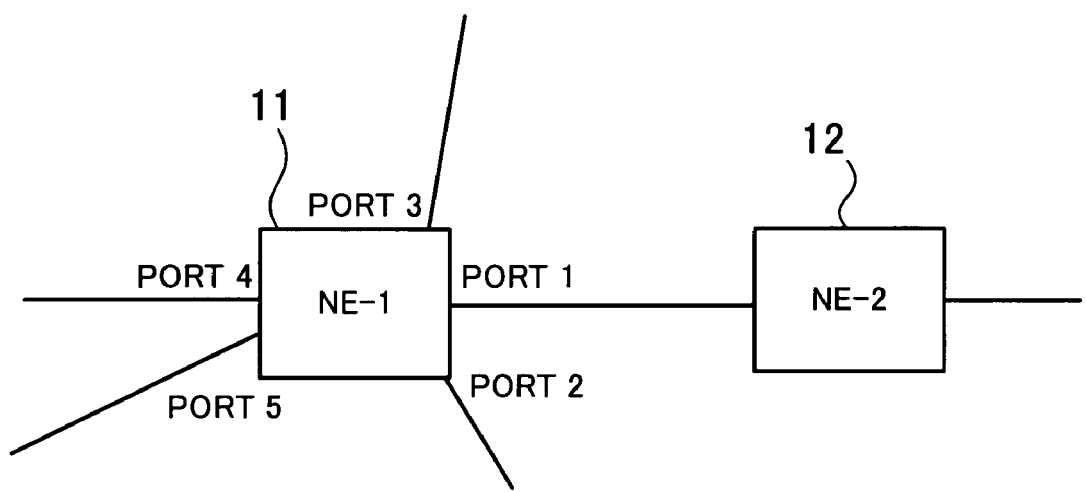
FIG. 9 is a view for describing a multi-area IS-IS function.

FIG. 9 is a view for describing the multi-area IS-IS function. In FIG. 9, NE-1 (NE 11) and NE-2 (NE 12) shown in FIG. 2 are shown. As shown in FIG. 9, NE-1 has ports 1 through 5. The port 1 is connected to NE-2, the port 2 is connected to NE-10 shown in FIG. 2, the port 3 is connected to the management unit 33, the port 4 is connected to NE-16, and the port 5 is connected to NE-20.

In the above item 3, NE-1 and NE-2 on both sides of the division point B1 are selected as AGLs which receive the area division command PDU. In this example, however, only NE-1 in the existing area is selected as an AGL. The port 1 connected to NE-2 in the new area has the new area address. NE-2 in the new area which is a level-one apparatus and which is connected to the port 1 has the new area address. By using the multi-area IS-IS function in this way, only an NE in the existing area may be selected as an AGL.

The method for calculating area division points used in the above item 2 will now be described in detail. Each NE informs the NL of traffic between it and an NE connected thereto. The NL creates the network topology and traffic management table 42 shown in FIGS. 7 and 8.

The NL recognizes from the network topology and traffic management table 42 created that there is much traffic from NE-10 to NE-1. This traffic is based on traffic from NE-11 to NE-10. The traffic from NE-11 to NE-10 is based on traffic from NE-9 to NE-11 and traffic from NE-12 to NE-11. Accordingly, if NE-11 is disconnected from NE-9 by area division or if NE-11 is disconnected from NE-12 by area division, then the traffic to NE-11 is reduced. NE-9 is part of the ring R1. Therefore, even if NE-11 is disconnected from NE-9 by area division, NE-11 can exchange data with NE-9 via another path. NE-12 is part of the ring R2. Therefore, even if NE-11 is disconnected from NE-12 by area division, NE-11 can exchange data with NE-12 via another path. It is assumed that NE-11 is disconnected from NE-9 by area division.

NE-1, NE-2, and NE-9 form the same ring R1. Accordingly, a candidate for another area division point is between NE-1 and NE-2. A candidate for an area division point may be between NE-2 and NE-3. For example, however, an area division point should be selected so that the number of apparatus in each area after division will be equal or roughly equal.

AGLs are selected so that traffic will be reduced by area division. Therefore, NE-1 and NE-2 adjacent to the division point B1 are selected as AGLs instead of NE-11 and NE-9 adjacent to the division point B2.

A great priority value may be set in advance for an NE having large traffic handling capability. If there are plurality of candidate area division points, an NE having the greater priority value is selected from NEs adjacent to a division point in an area where an NL is as an AGL. Basically, the total traffic volume between the NEs does not change by area division. By selecting an NE (NE-1, for example) having large traffic handling capability as an AGL and making area division, however, traffic concentration at an NE (NE-11, for example) having a little traffic handling capability can be avoided.

An NE opposite to the NE selected as an AGL should be selected as an AGL in a new area formed as a result of the division. If two NEs have the same priority value, then an NE having the greater SYS ID should be selected. As stated above, however, an AGL should be selected so that traffic will be reduced, as a rule.

With the IS-IS protocol, a route where the number of hops is small is selected in the same area. In the area before the division shown in FIG. 2, NE-6, NE-7, and NE-8 communicate with NE-1 not via NE-4, NE-3, and NE-2 but via NE-9, NE-11, and NE-10 because the number of hops on the latter route is smaller than that of hops on the former route. As a result, traffic is concentrated at NE-11.

The case where the number of NEs which are level-one apparatus and which are connected in an area exceeds a threshold will now be described. In this case, a trigger for the beginning of area division is not traffic but the number of NEs connected. This case differs from the above case in that respect. This case also differs from the above case in that, for example, area division points which make the number of NEs in a new area equal or roughly equal to that of NEs in an existing area (not including the new area) are calculated.

It is assumed that the number of NEs which can be connected in one area is 300. When a new NE is connected in this area and the number of NEs reaches 300, operation corresponding to the above item 2, that is to say, calculations of division points are performed. As stated above, division points are calculated so that, for example, the number of NEs in a new area will be equal or roughly equal (there are cases where the number of NEs cannot be divided into two halves) to that of NEs in an existing area. Operation described in the above items 3 through 16 is then performed.

When the area division points are selected, a user may set the number of NEs in the new and existing areas. To be concrete, the following procedure can be adopted.

1. A branch in the topology which is not part of a ring on a network is detected. For example, in FIG. 2 NE-6, NE-7, and NE-8 are detected.

2. The number of NEs connected to the branch detected, together with an NE which is at the joint of the branch, is saved and the NEs connected to the branch detected are treated as candidate division points.

3. An area in which a ring is formed is then searched for.

4. The number of NEs in each of areas formed by dividing the area in which the ring is formed is examined. This number, together with NEs on both sides of area division points, is saved. The area division points used in this case are also treated as candidate division points.

5. The candidate division points on the branch and the ring are compared. If the number of NEs in each area formed as a result of division is close to a set number, then candidate division points used for the division are adopted as division points.

If the number of NEs connected reaches a threshold, area division can automatically be made in this way.

An example in which a new NE connected in an area automatically recognizes an area address will now be described. As shown in FIG. 5, the AISP includes an area address request PDU. When the new NE connected in the area is started, the new NE sends an area address request PDU to an apparatus connected thereto and acquires an area address of the area to which it belongs. As a result, the new NE can automatically be connected in the area. There is no need for a user to set the area address in advance.

In some cases, a maintainer may want to designate the division points described above. In such cases, the maintainer uses the management unit 33 for instructing the NL when to make automatic area division and giving the NL instructions to stop the function of calculating division points. The maintainer then sets data (area division points and AGLs) necessary for area division for the NL and issues an area division start command to the NL. By doing so, area division operation can be performed in accordance with setting by the maintainer.

The automatic area division operation in FIG. 2 will now be described by using sequence diagrams. In the following sequence diagrams, not all the NEs are shown. However, the same processes are performed by the other NEs.

Figure 10:
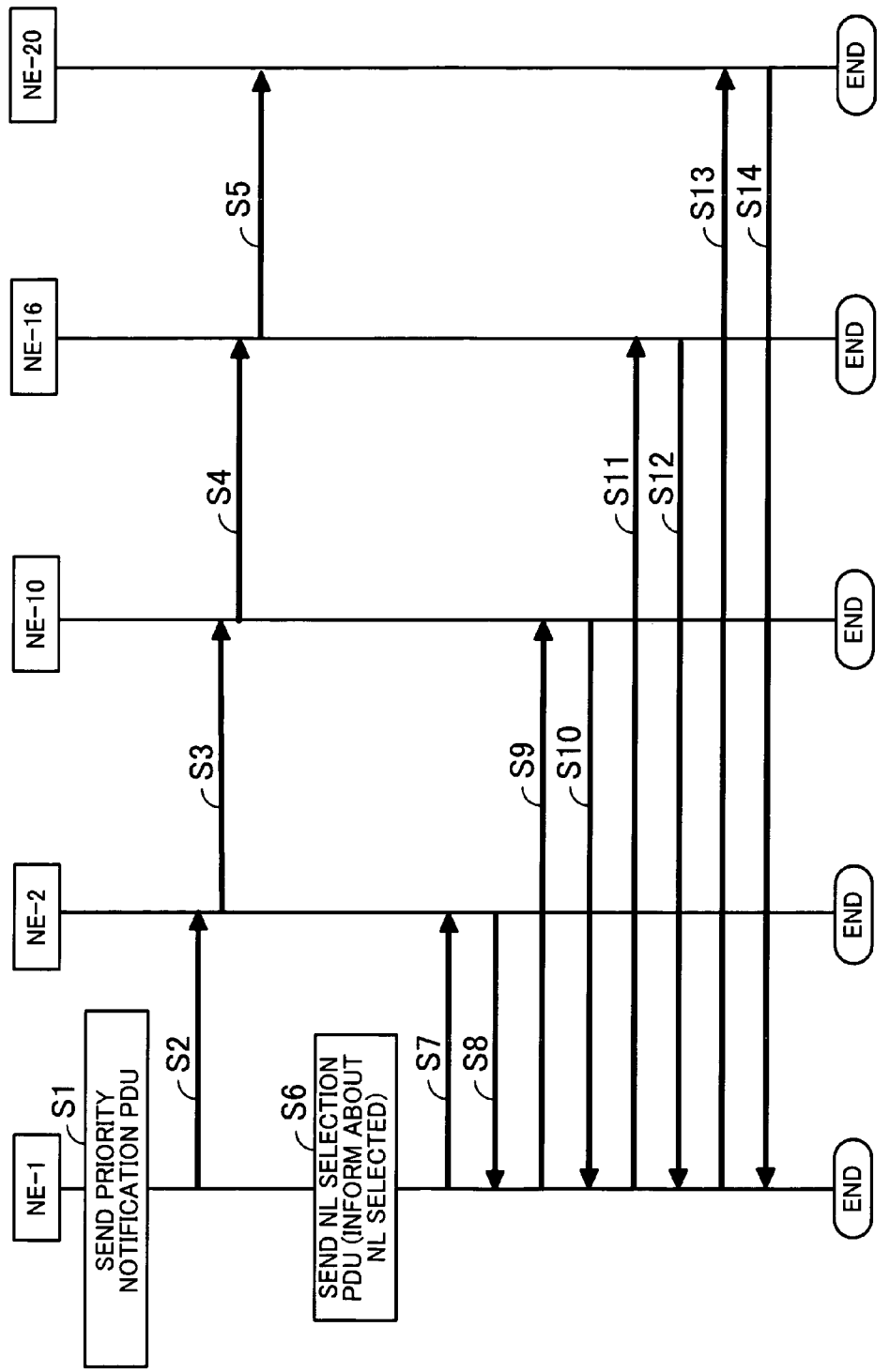
FIG. 10 is a sequence diagram of NL selection.

The sequence of NL selection will be described first. FIG. 10 is a sequence diagram of NL selection. NL selection is regularly made. NE-1 sends NE-2 a priority notification PDU (steps S1 and S2). NE-2 saves a priority value of NE-1 included in the priority notification PDU sent from NE-1 and sends the priority notification PDU to NE-10 (step S3). NE-10 receives the priority notification PDU sent from NE-2, saves the priority value of NE-1, and sends the priority notification PDU to NE-16 (step S4). NE-16 receives the priority notification PDU sent from NE-10, saves the priority value of NE-1, and sends the priority notification PDU to NE-20 (step S5). NE-20 receives the priority notification PDU sent from NE-16 and saves the priority value of NE-1. Each NE other than NE-1 also sends a priority notification PDU including its priority value. Each NE saves the priority values of the other NEs.

Each NE compares its priority value and the priority values of the other NEs. An NE the priority value of which is the greatest recognizes that it is selected as an NL, and sends an NL selection PDU to each NE. In FIG. 10, it is assumed that NE-1 is selected as an NL.

NE-1 sends an NL selection PDU to each NE (steps S6, S7, S9, S11, and S13). NE-1 receives ACK of the NL selection PDU from each NE and checks that each NE is not selected as another NL (steps S8, S10, S12, and S14). NE-1 is treated as an NL until an NE the priority value of which is greater than that of NE-1 appears. If an NE the priority value of which is greater than that of NE-1 appears, then this NE is selected as an NL. However, NL selection is prohibited during an area division process.

Figure 11:
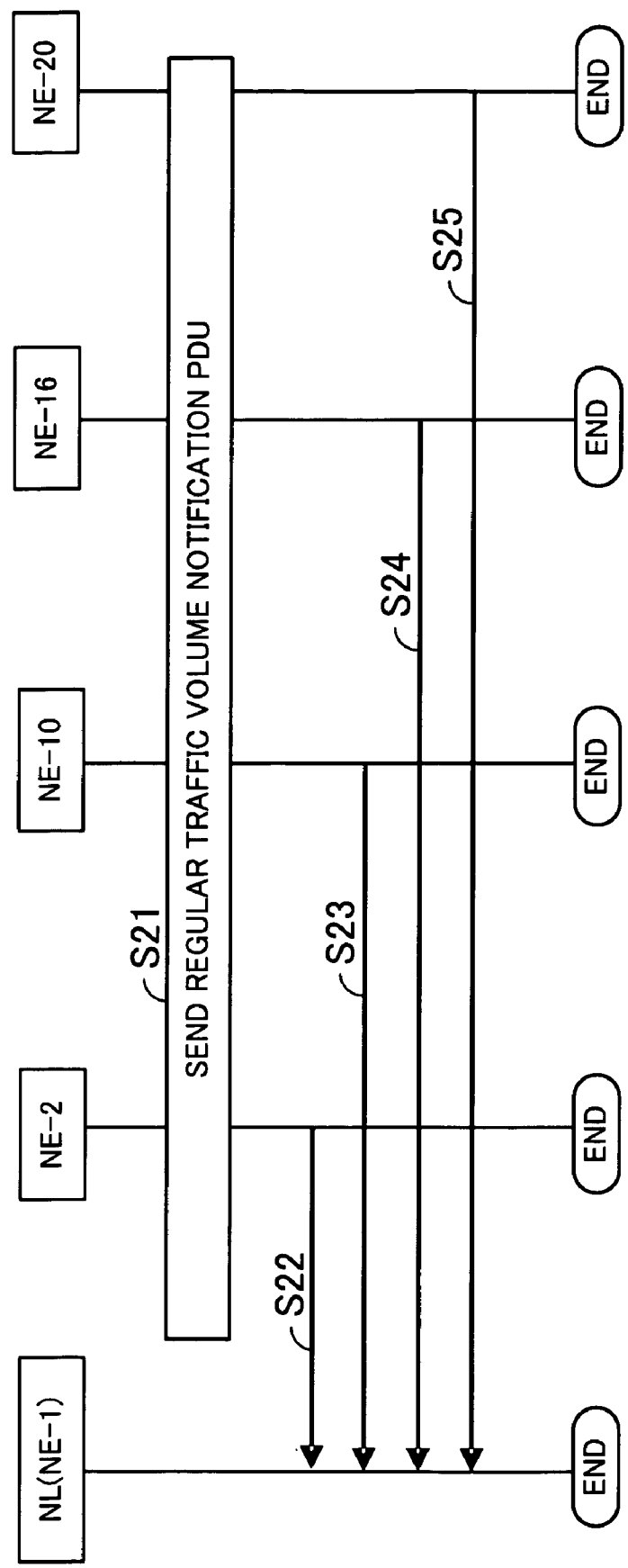
FIG. 11 is a sequence diagram of traffic notification.

Traffic notification will now be described. FIG. 11 is a sequence diagram of traffic notification. Each NE which is not selected as an NL regularly sends the NL (NE-1) a regular traffic volume notification PDU including its traffic information (steps S21 through S25). As a result, the NL acquires traffic at each NE and creates the network topology and traffic management table 42 shown in FIGS. 7 and 8.

Figure 12:
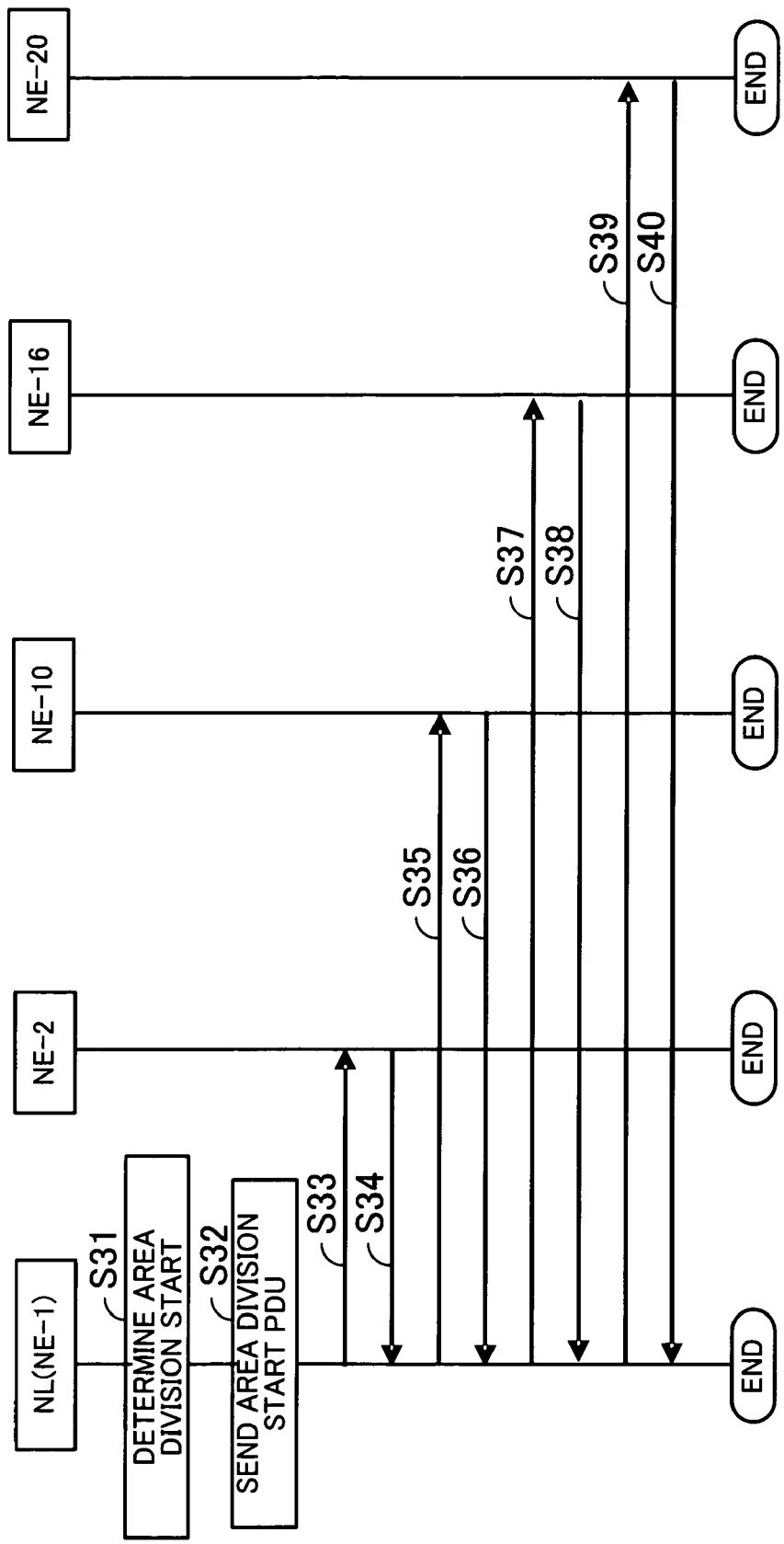
FIG. 12 is a sequence diagram of area division start.

Area division start will now be described. FIG. 12 is a sequence diagram of area division start. The NL determines area division start (step S31). For example, to determine area division start, the NL refers to the network topology and traffic management table 42 and checks whether a traffic volume at an NE exceeds a threshold or whether the number of NEs which are level-one apparatus and which are connected in an area exceeds a threshold.

If a traffic volume at the NE exceeds the threshold or if the number of NEs which are level-one apparatus and which are connected in the area exceeds the threshold, then the NL sends an area division start PDU to each NE (steps S32, S33, S35, S37, and S39). When each NE receives the area division start PDU, it goes into an area division processing state and returns ACK to the NL (steps S34, S36, S38, and S40).

Figure 13:
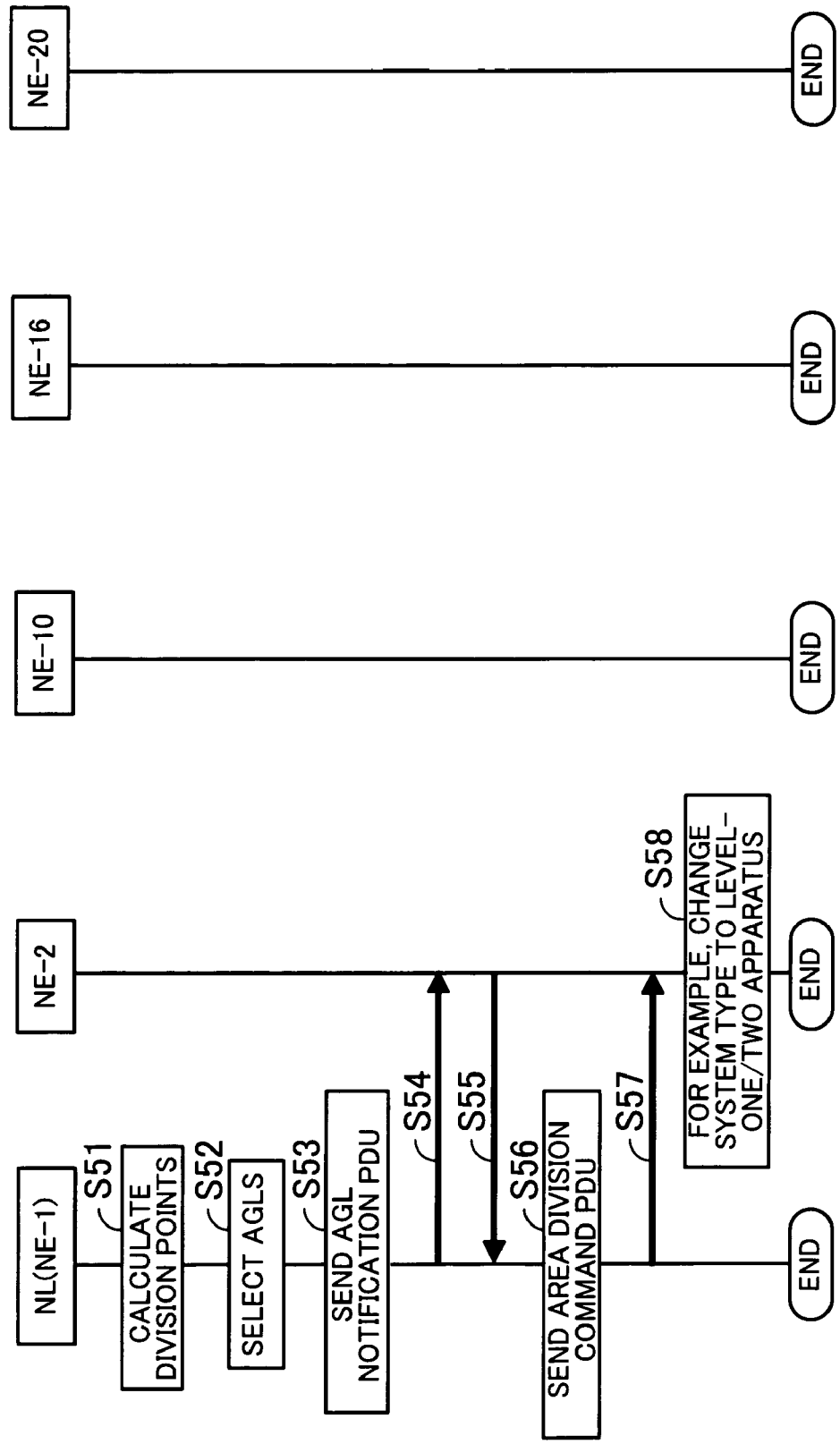
FIG. 13 is a sequence diagram of an area division command.

An area division command will now be described. FIG. 13 is a sequence diagram of an area division command. The NL calculates area division points (step S51). In FIG. 2, it is assumed that the division points B1 and B2 are calculated. The NL then selects AGLs (step S52). NEs on the both sides of one division point are selected as AGLs. For example, NE-1 and NE-2 are selected as AGLs. The NL sends an AGL notification PDU to the AGL (NE-2) it selected (steps S53 and S54). NE-1 is not only an AGL but also an NL, so there is no need to sends an AGL notification PDU to NE-1. NE-1 can recognize that it is selected as an AGL.

When NE-2 selected as an AGL receives the AGL notification PDU from the NL, it NE-2 returns ACK to the NL (step S55). When the NL receives the ACK form the AGL, the NL sends an area division command PDU to the AGL (steps S56 and S57).

When the AGL receives the area division command PDU from the NL, the AGL starts area division (step S58). First, the AGL changes its system type to the level-one/two apparatus. NE-2 which is to belong to a new area changes its area address to a new area address. In addition, NE-2 sets a manual area address.

Figure 14:
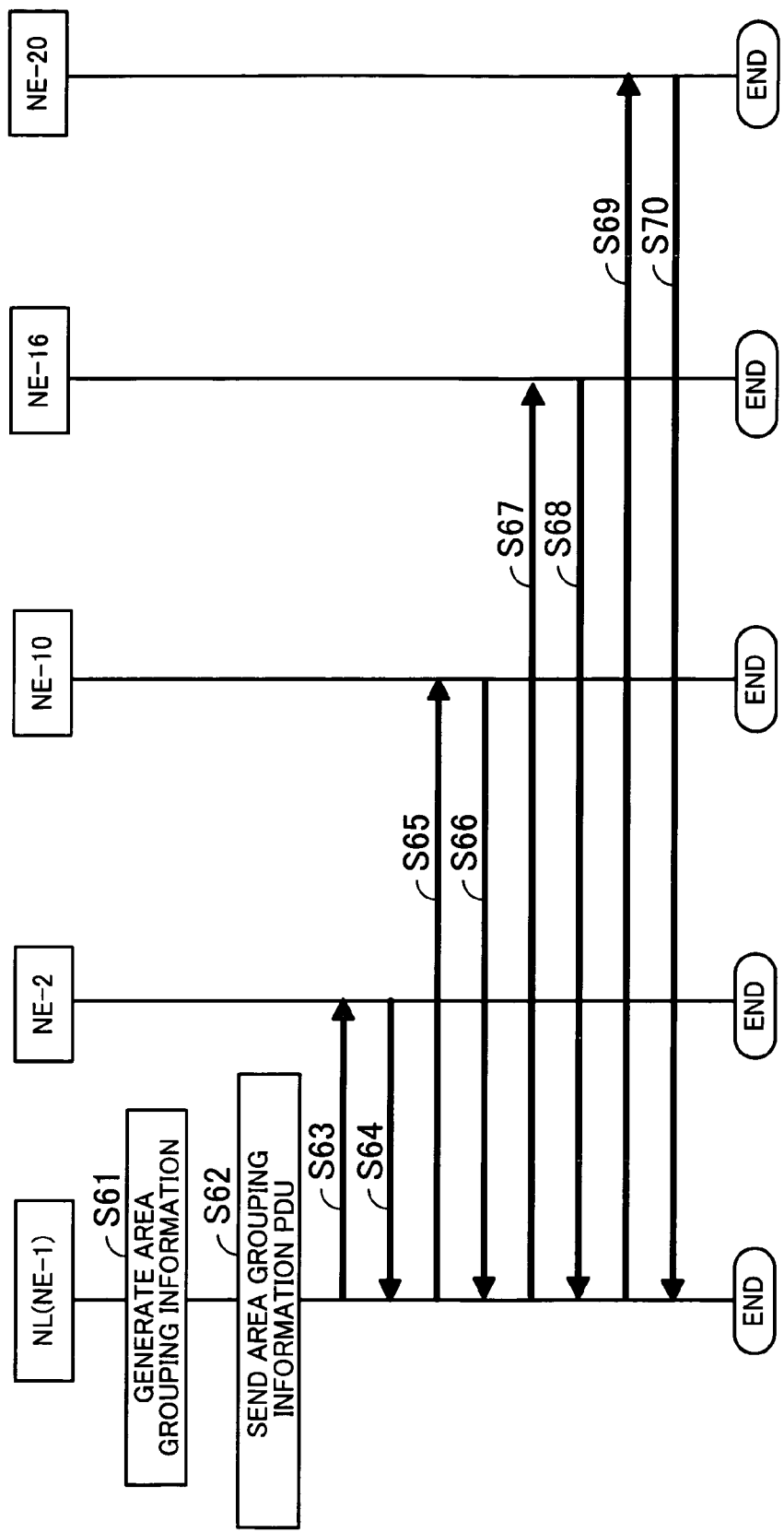
FIG. 14 is a sequence diagram of area grouping information transfer.

Area grouping information transfer will now be described. FIG. 14 is a sequence diagram of area grouping information transfer. The NL generates area grouping information including information regarding NEs which are to belong to an existing area, information regarding NEs which are to belong to the new area, and new area address information (step S61). The NL sends each NE an area grouping information PDU including the area grouping information it generated (steps S62, S63, S65, S67, and S69). Each NE which receives the area grouping information returns ACK to the NL (steps S64, S66, S68, and S70).

Figure 15:
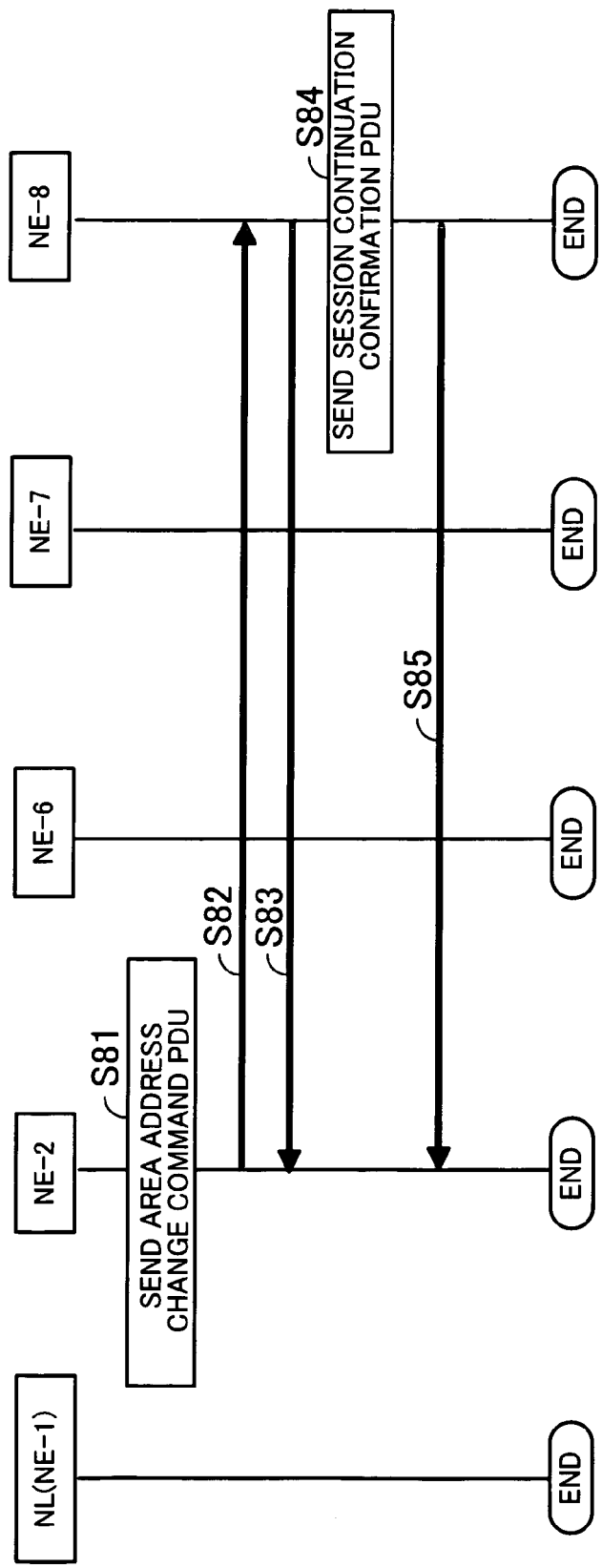
FIG. 15 is a sequence diagram of an area address change process.

A change in the area address of each NE will now be described. FIG. 15 is a sequence diagram of an area address change process. An AGL (NE-2) which is to belong to the new area sends an area address change command PDU to an NE (NE-8 in FIG. 15) the area address of which must be changed to the new area address (steps S81 and S82). The AGL sends an area address change command PDU to NEs in ascending order of the distance from the AGL from the viewpoint of topology. In FIG. 15, the AGL sends an area address change command PDU to NE-8.

The NE which receives the area address change command PDU changes its area address to the new area address and sets the manual area address. The NE then returns ACK to the AGL (step S83).

The NE sends a session continuation confirmation PDU to the AGL in order to inform the AGL that an existing session can be continued by using the manual area address (steps S84 and S85).

Figure 16:
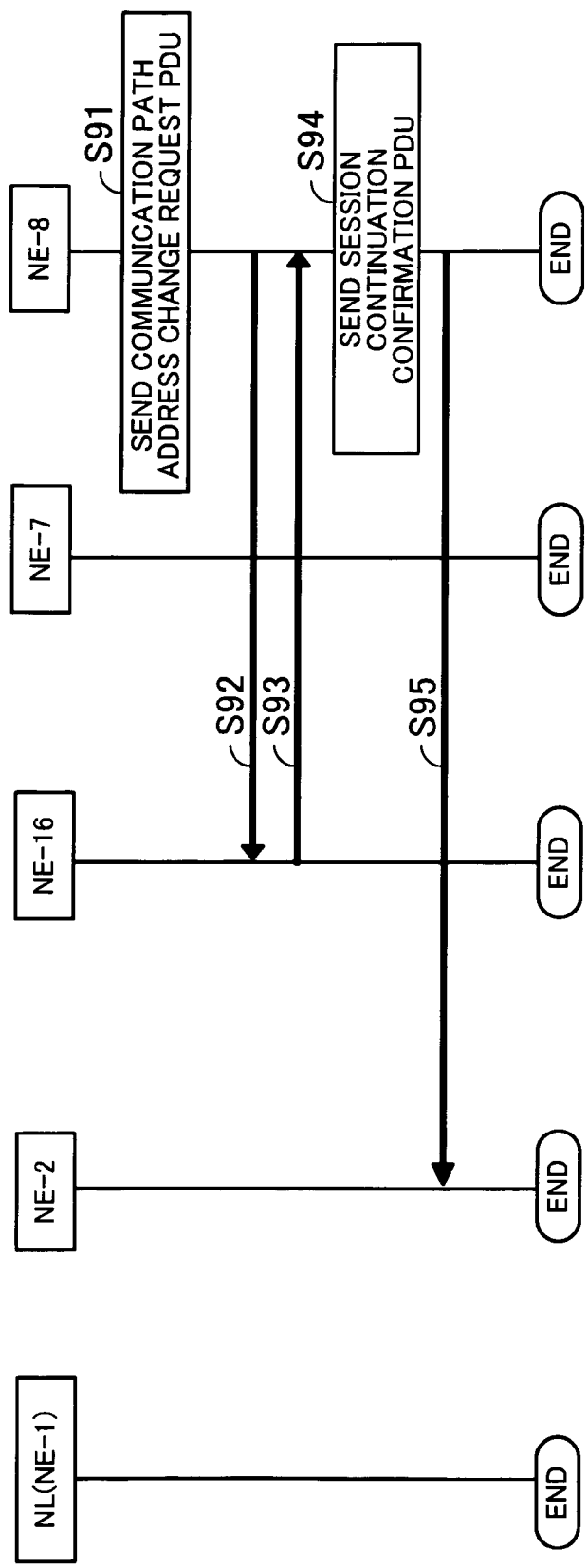
FIG. 16 is a sequence diagram of a new area address use request.

A new address use request will now be described. FIG. 16 is a sequence diagram of a new area address use request. Each NE which has changed its area address to the new area address sends a communication path address change request PDU to an NE at the other end during an existing session (NE with which it has established the session) in order to make an address change request (steps S91 and S92). In this example, NE-8 has established a session with NE-16. As a result, NE-16 which receives the communication path address change request PDU rewrites NSAP address information and the like stored in a communication path management table. NE-2 sends NE-8 ACK for the communication path address change request PDU (step S93). NE-8 sends a session continuation confirmation PDU to the AGL in order to inform the AGL that the session is continued by using the new area address (steps S94 and S95).

As a result, level-two routing is begun. Accordingly, data communication is not performed via the route from NE-9 to NE-10, for example, in FIG. 2.

Figure 17:
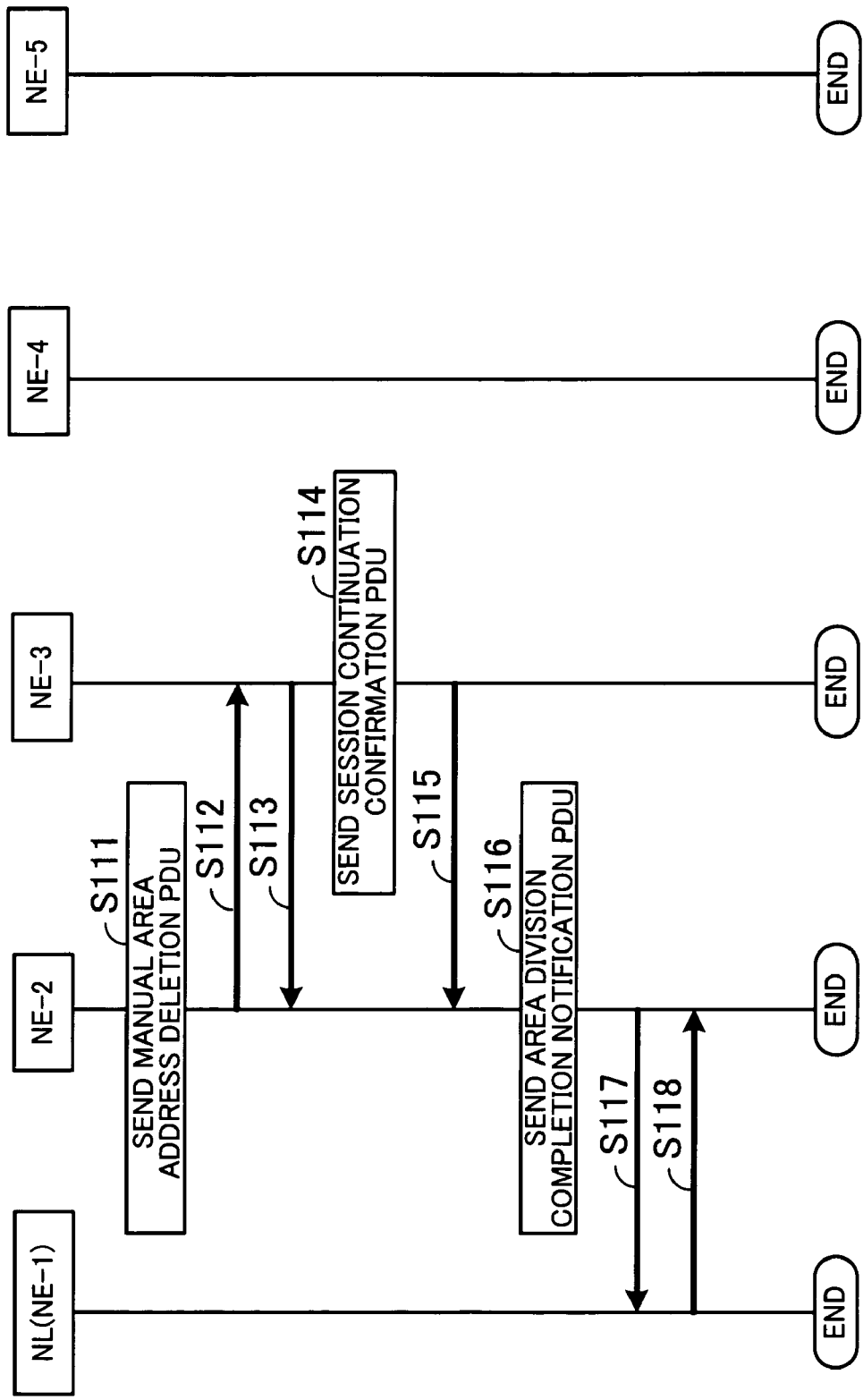
FIG. 17 is a sequence diagram of a manual area deletion request process.

A manual area deletion request process will now be described. FIG. 17 is a sequence diagram of a manual area deletion request process. The AGL sends each NE a manual area address deletion PDU to make a request for the deletion of the manual area address (steps S111 and S112). In FIG. 17, the sending of a manual area address deletion PDU to the other NEs is not shown.

The NE which receives the manual area address deletion PDU returns ACK to the AGL (step S113). After the NE deletes the manual area address, the NE sends a session continuation confirmation PDU to the AGL in order to inform the AGL that a session is continued (steps S114 and S115).

After the AGL performs the processes in the above steps on each NE, the AGL sends the NL an area division completion notification PDU which indicates that the area division is completed (steps S116 and S117). The NL which receives the area division completion notification PDU from the AGL returns ACK to the AGL (step S118).

Figure 18:
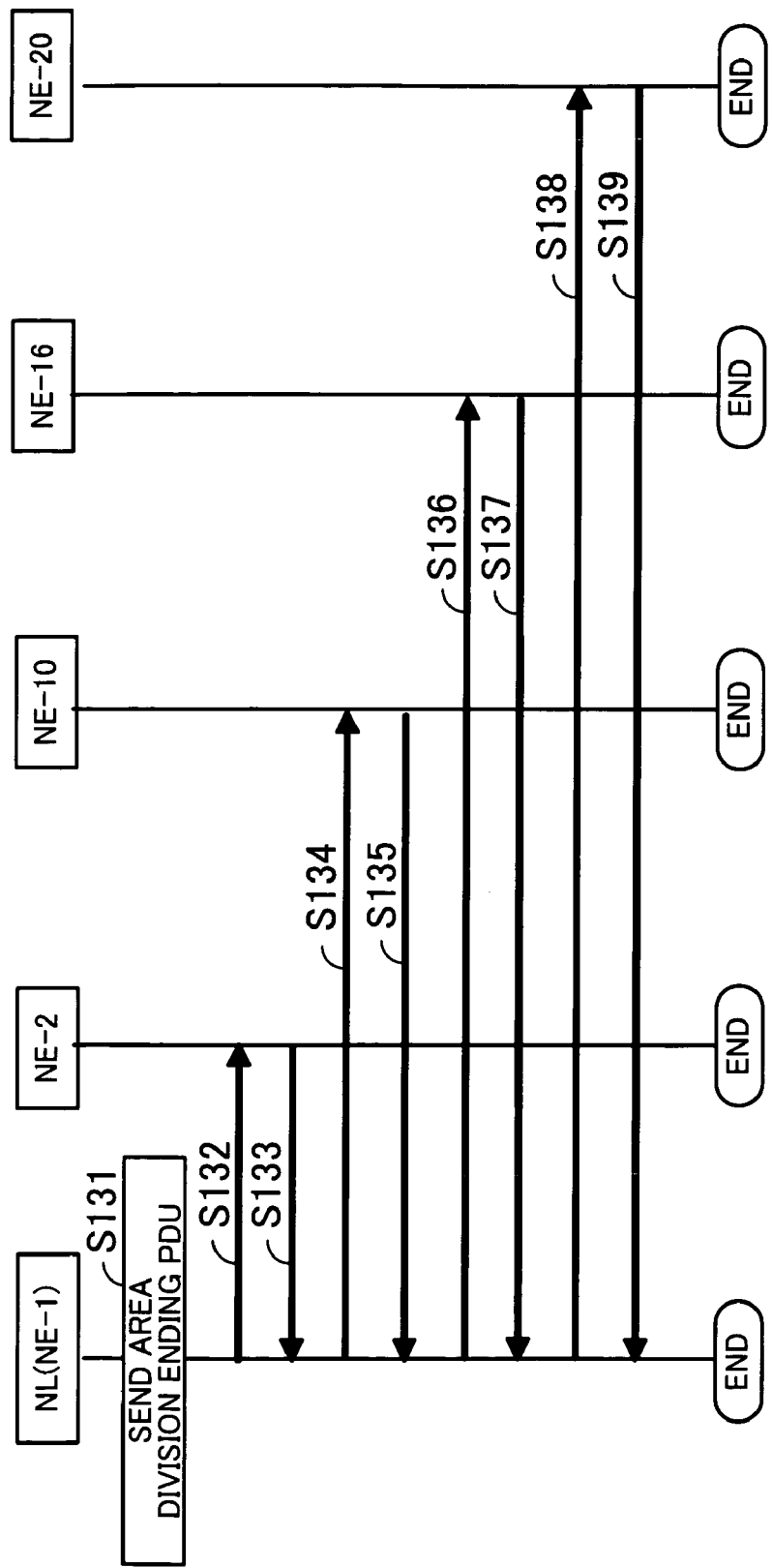
FIG. 18 is a sequence diagram of an area division ending process.

An area division ending process will now be described. FIG. 18 is a sequence diagram of an area division ending process. The NL sends each NE an area division ending PDU (steps S131, S132, S134, S136, and S138). Each NE which receives the area division ending PDU returns ACK to the NL and changes from the area division processing state to the normal communication state (steps S133, S135, S137, and S139).

Figure 19:
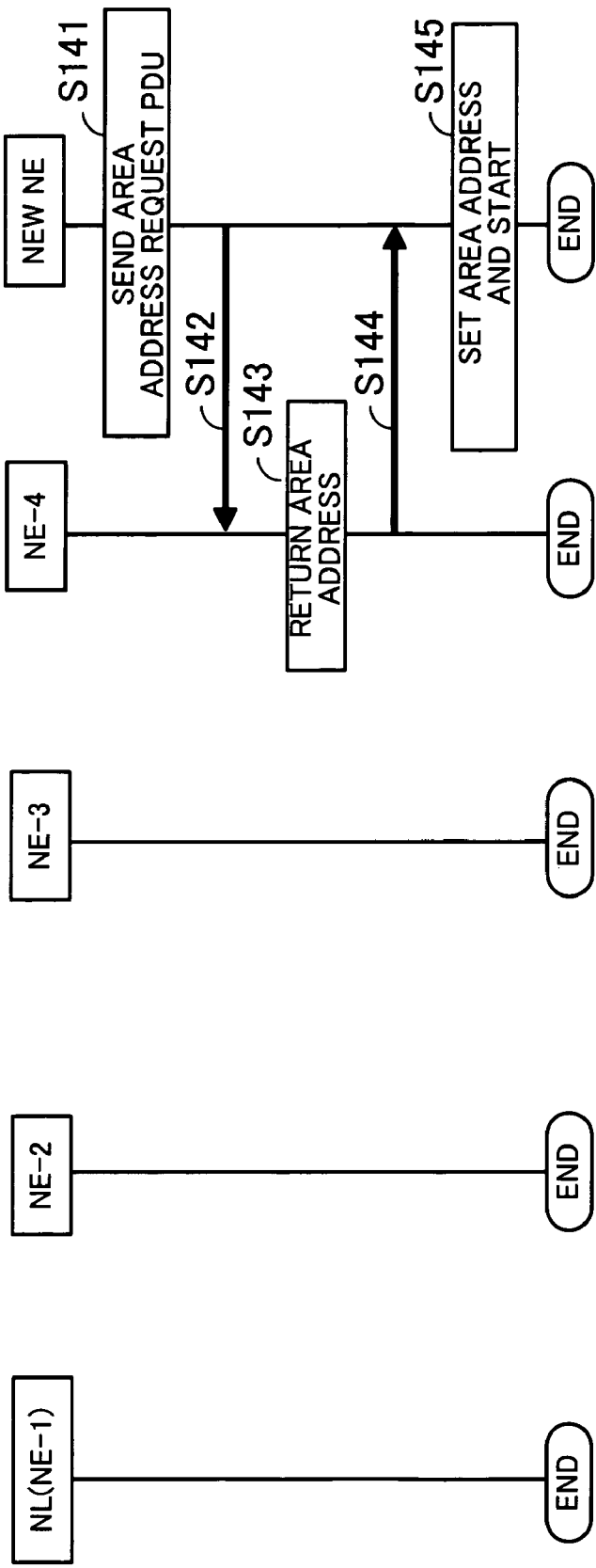
FIG. 19 is a sequence diagram of area address acquisition.

The automatic area division operation has been described by using the sequence diagrams. The case where a new NE connected in an area automatically recognizes an area address will now be described. FIG. 19 is a sequence diagram of area address acquisition. It is assumed that a new NE is connected to NE-4. The new NE sends an area address request PDU to NE-4 to which it is connected in order to inquire an area address of an area to which it is to belong (steps S141 and S142). NE-4 returns the area address to the new NE (steps S143 and S144). The new NE sets the area address it receives from NE-4, and starts (step S145).

Figure 20:
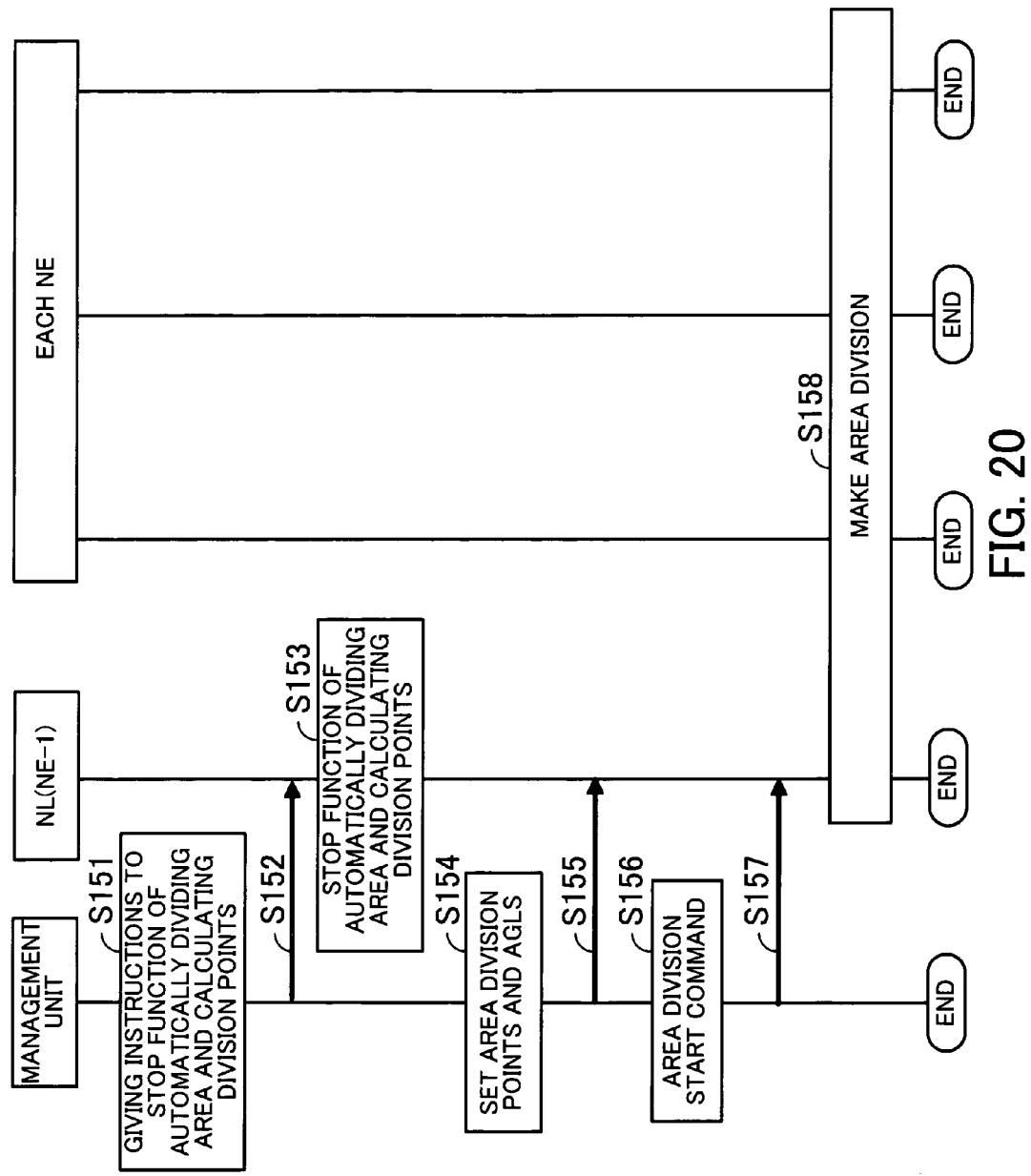
FIG. 20 is a sequence diagram of area division by a maintainer.

Area division by a maintainer will now be described by using a sequence diagram. FIG. 20 is a sequence diagram of area division by a maintainer. A maintainer uses the management unit 33 for giving the NL instructions to stop the function of automatically dividing an area and calculating division points (steps S151 and S152). The NL stops the function of automatically dividing an area and calculating division points in accordance with the instructions from the management unit 33 (step S153).

The maintainer uses the management unit 33 for setting area division points and AGLs for the NL (steps S154 and S155). The maintainer then uses the management unit 33 for issuing an area division start command to the NL (steps S156 and S157). The NL and each NE perform the processes in and after step S53 shown in FIG. 13 to make area division (step S158).

Figure 21:
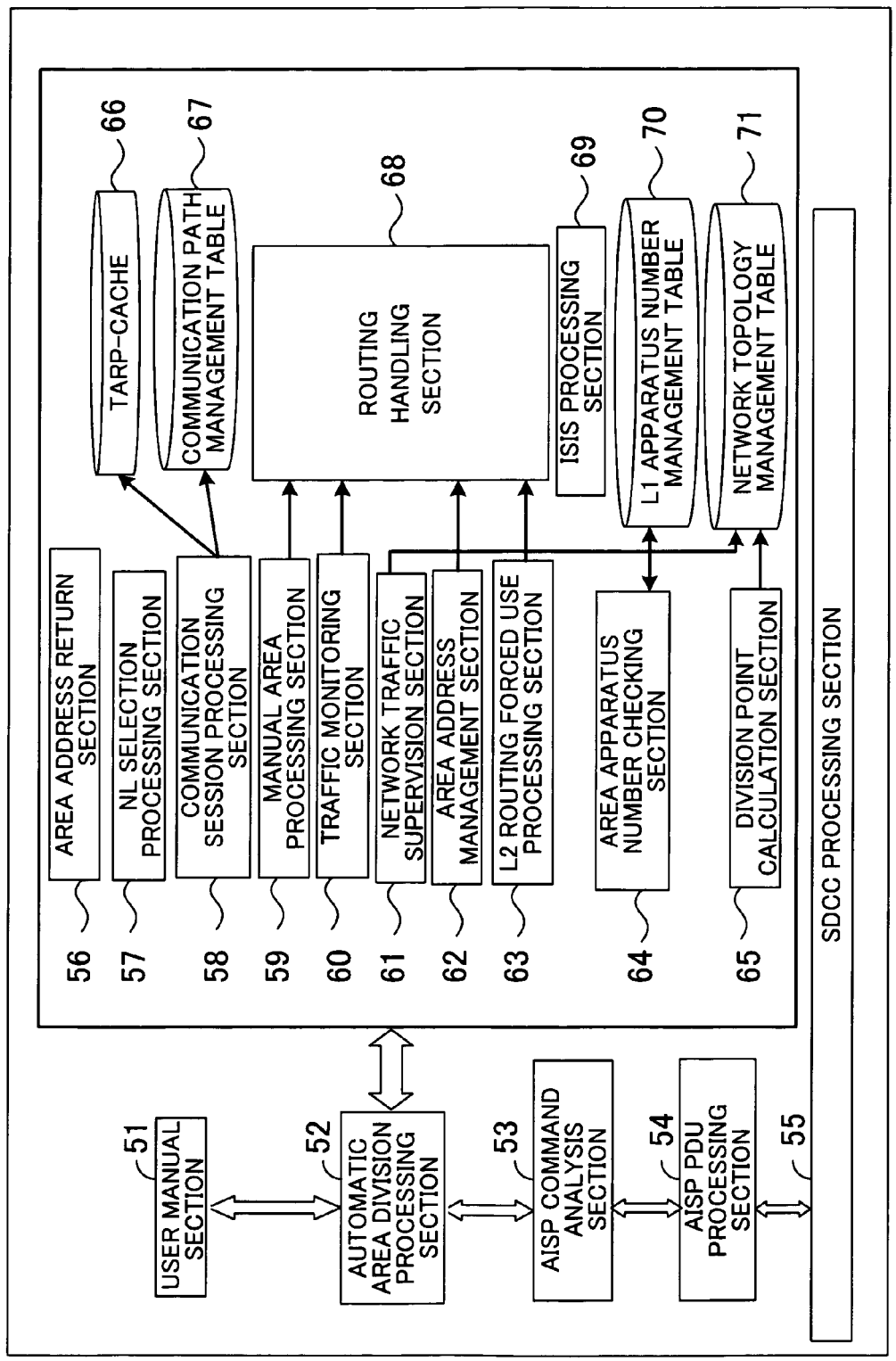
FIG. 21 is a functional block diagram of an NE.
Figure 22A:
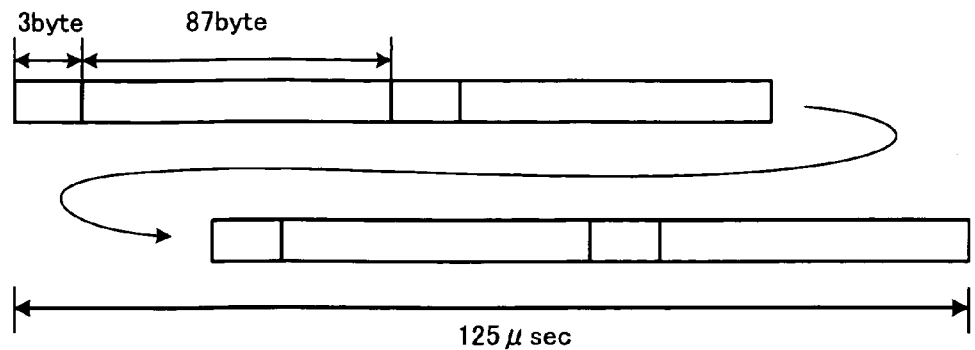
FIGS. 22A, 22B, and 22C are views for describing a SONET frame.
Figure 22B:
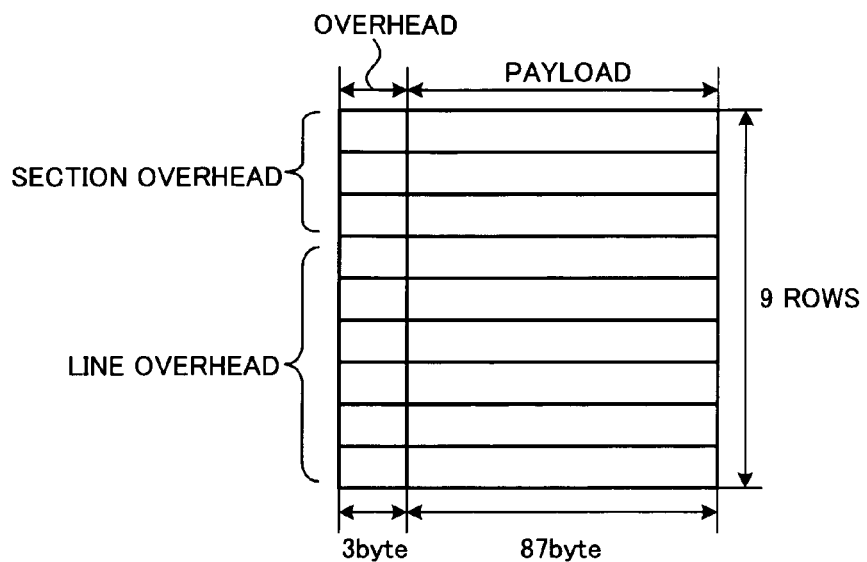
Figure 22C:
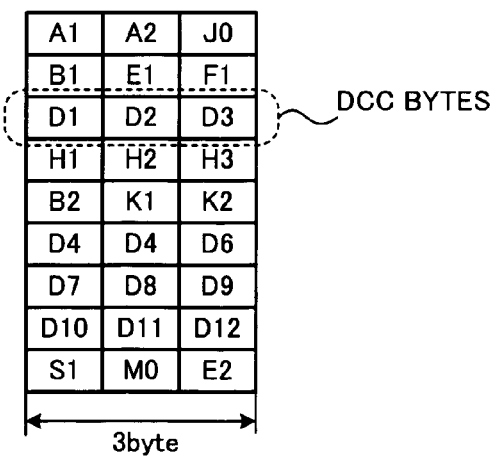
Figure 23:
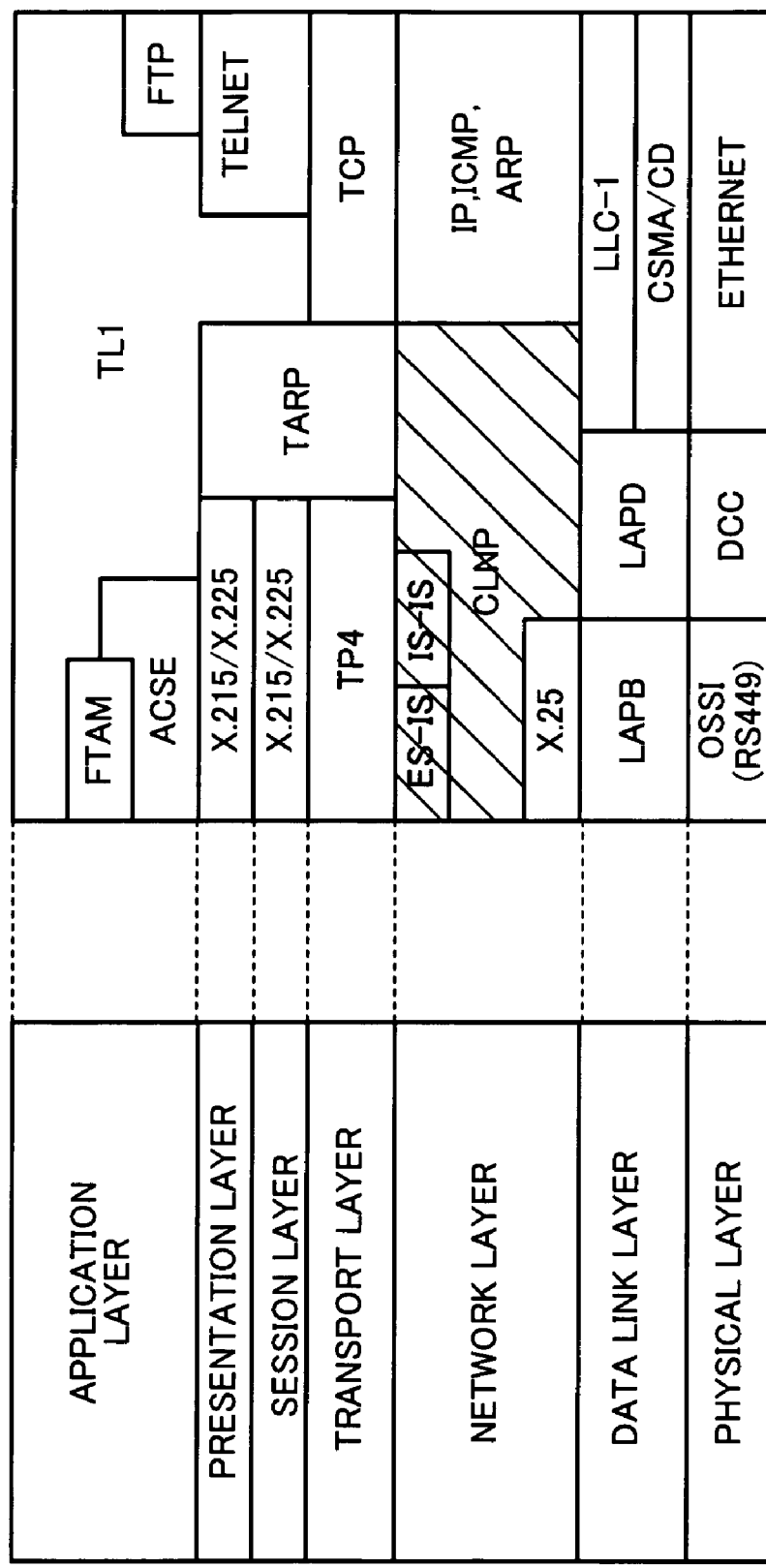
FIG. 23 shows an example of a protocol stack for a centralized control center and a transmission apparatus.
Figure 25A:
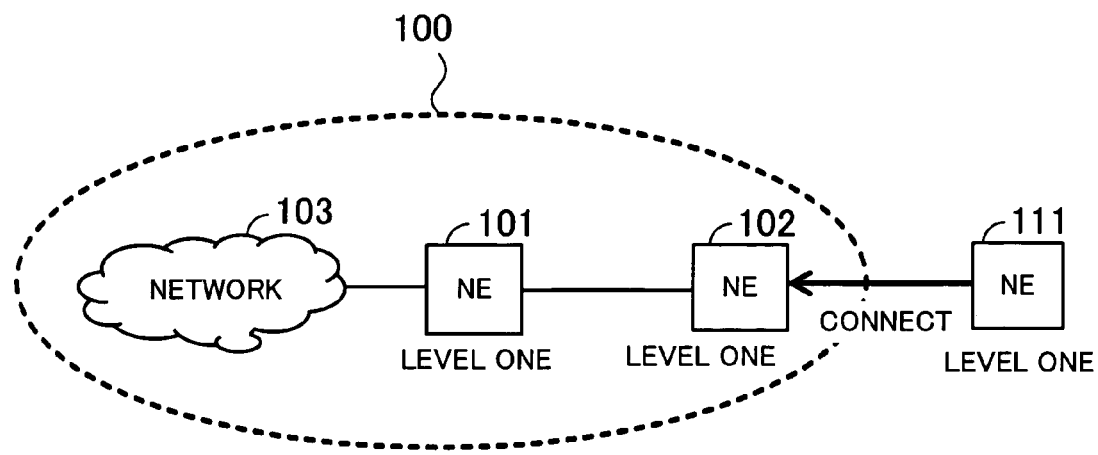
FIGS. 25A and 25B are views for describing an example of the case where a second area is newly formed and where a level-one apparatus is newly connected.
Figure 25B:
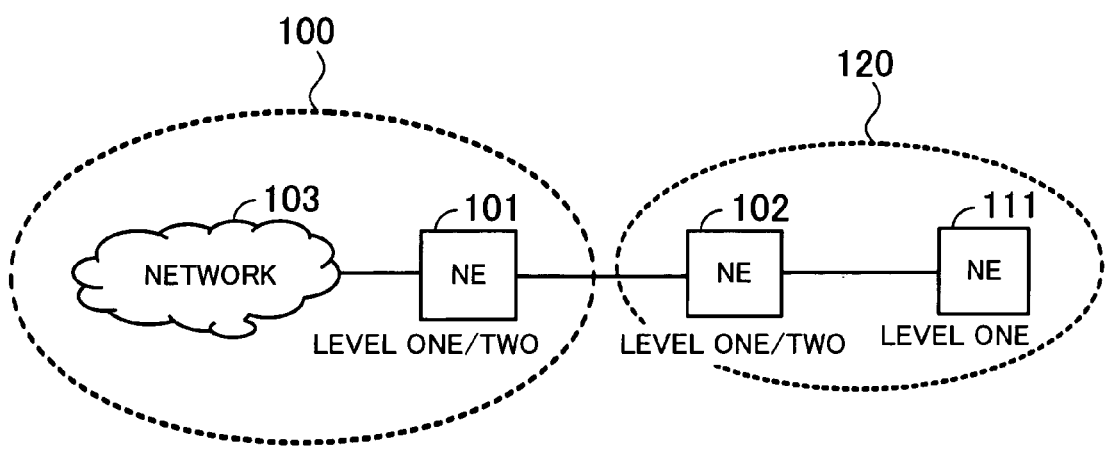
Figure 26:
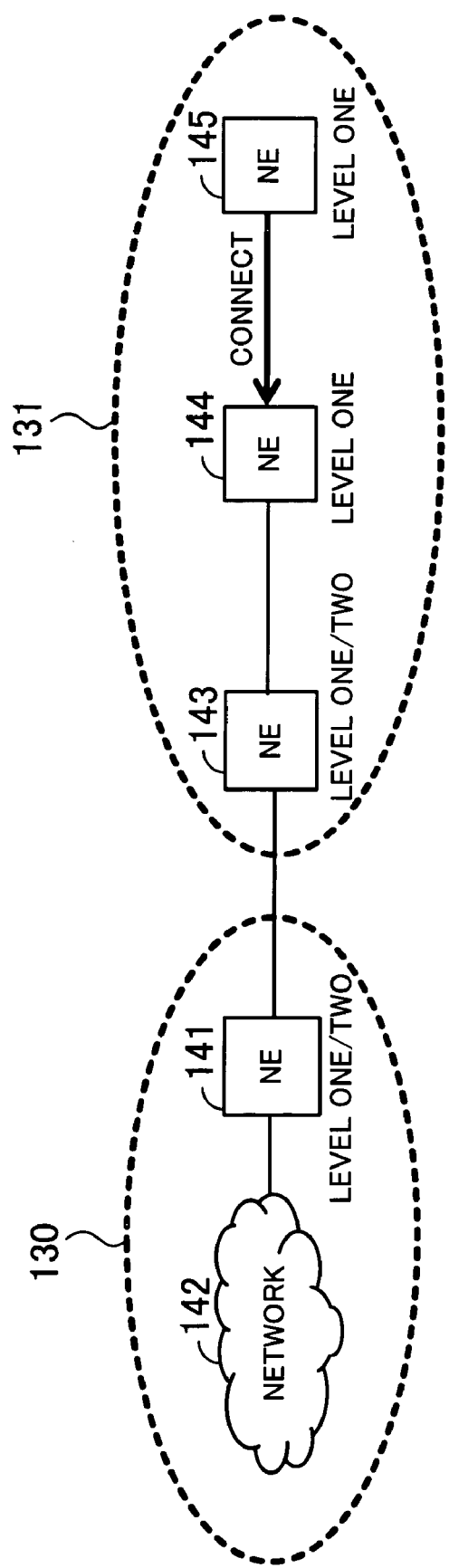
FIG. 26 is a view for describing the case where an NE is connected in a new area.
Figure 27:
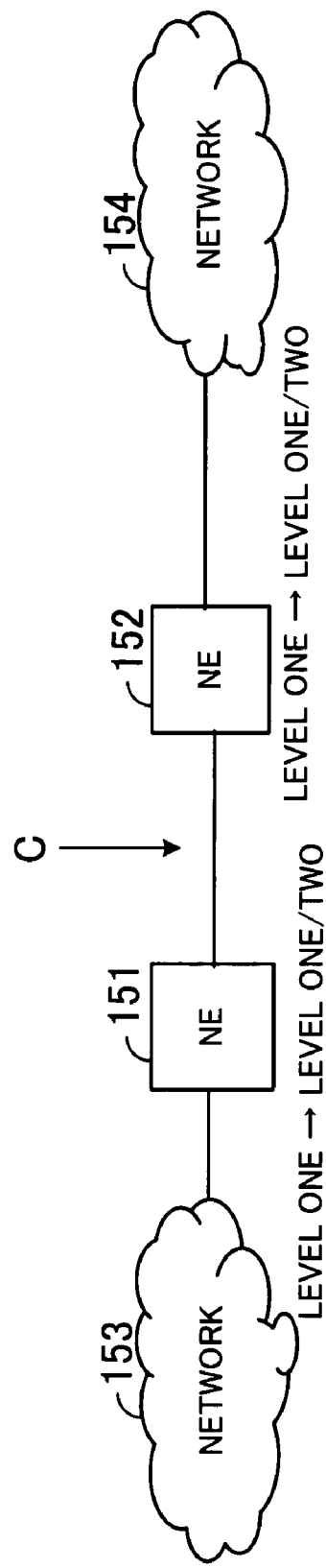
FIG. 27 is a view for describing area division.

Functional blocks of an NE will now be described. FIG. 21 is a functional block diagram of an NE. As shown in FIG. 21, an NE includes a user manual section 51, an automatic area division processing section 52, an AISP command analysis section 53, an AISP PDU processing section 54, and an SDCC processing section 55. The NE further includes an area address return section 56, an NL selection processing section 57, a communication session processing section 58, a manual area processing section 59, a traffic monitoring section 60, a network traffic supervision section 61, an area address management section 62, a level-two (L2) routing forced use processing section 63, an area apparatus number checking section 64, and a division point calculation section 65. In addition, the NE includes a TARP-CACHE 66, a communication path management table 67, a routing handling section 68, an ISIS processing section 69, a level-one (L1) apparatus number management table 70, and a network topology and traffic management table 71.

The user manual section 51 accepts a command inputted from the management unit 33 by a manager.

The automatic area division processing section 52 assigns processes to each processing section according to the contents of the AISP, manages a change in state at the time of an area division process, and performs a process in accordance with the command from the manager accepted by the user manual section 51.

The AISP command analysis section 53 checks the format and PDU ID of data received and determines whether the data is correct. If the data is incorrect, then the AISP command analysis section 53 discards it.

The AISP PDU processing section 54 takes AISP data from an SDCC area (which is a data link layer area made up of the DCC bytes of SONET and which is used for transmitting information regarding a protocol stack corresponding to the OSI reference model between NEs) and passes it to the AISP command analysis section 53. In addition, the AISP PDU processing section 54 requests the SDCC processing section 55 to send data the sending of which is requested by the AISP command analysis section 53 as SDCC data.

The SDCC processing section 55 checks the contents of SDCC data it receives. If the SDCC data is AISP data, then the SDCC processing section 55 passes the SDCC data to the AISP PDU processing section 54. In addition, when the SDCC processing section 55 is requested by the AISP PDU processing section 54 to send the data, the SDCC processing section 55 sends the data to a corresponding port as SDCC data.

When the area address return section 56 receives an area address request PDU from a second NE, the area address return section 56 returns an area address which the second NE must set.

When the NL selection processing section 57 receives a priority notification PDU from a second NE, the NL selection processing section 57 selects a network leader in an area. An NE which becomes an NL generates an NL selection PDU. When an NE which does not become an NL receives the NL selection PDU, the NE checks the validity of its contents and generates ACK.

The communication session processing section 58 generates a new address use request PDU. When the communication session processing section 58 receives a communication path address change request PDU, the communication session processing section 58 changes information set in the communication path management table 67. If communication can be continued, the communication session processing section 58 generates a session continuation confirmation PDU. The communication session processing section 58 also updates the TARP-CACHE 66.

The manual area processing section 59 sets and deletes a manual area address.

The traffic monitoring section 60 monitors traffic on each communication path and informs the NL of it.

The network traffic supervision section 61 totals the contents of regular traffic volume notification PDUs and determines the necessity for area division. If the network traffic supervision section 61 determines that area division must be made, the network traffic supervision section 61 informs the automatic area division processing section 52 of it.

The area address management section 62 changes the area address.

The L2 routing forced use processing section 63 gives a level-one apparatus which performs level-one routing communication by using a manual area address function instructions to switch to level-two routing communication via a level-two apparatus.

The area apparatus number checking section 64 checks the number of level-one apparatus in the same area, determines whether the number exceeds a threshold, and informs the automatic area division processing section 52 of a result.

The division point calculation section 65 calculates places (division points) at which the area is to be divided.

The TARP-CACHE 66 stores information (pairs of NASP and TID) obtained by the TARP protocol.

The communication path management table 67 stores information (such as an NSAP address of an NE at the other end and a session ID) regarding a communication session.

The routing handling section 68 calculates a route to an NE (destination) to which data is to be sent. The routing handling section 68 properly assigns a necessary communication route at each stage of an area division process in cooperation with the manual area processing section 59 and the L2 routing forced use processing section 63.

The ISIS processing section 69 processes the IS-IS protocol itself and supplies processing results to the routing handling section 68, the network topology and traffic management table 71, and the like.

The L1 apparatus number management table 70 saves the number of NEs in the same level-one routing area.

The network topology and traffic management table 71 stores a network topology (way in which NEs are interconnected). The network topology and traffic management table 71 in the NL also stores traffic information for each NE. An example of the data structure of the network topology and traffic management table 71 included in the NE selected as an NL is shown in FIGS. 7 and 8.

As stated above, area division is automatically made on the basis of the predetermined condition. This lessens the labor of a maintainer and reduces management costs.

Moreover, by setting a new area address and a manual area address and rewriting NSAP address information and the like in the communication path management table 67 with a communication path address change request PDU, area division can be made with a session continued.

Furthermore, area division is automatically made, so area design by division does not depend on a maintainer's skills.

Traffic concentration caused by area design must be detected before communication trouble occurs. In the present invention, when traffic monitored exceeds a threshold, area division is automatically made. This suppresses the occurrence of communication trouble.

In addition, if a new NE is connected in an area, the new NE automatically acquires an area address. This obviates the manual setting of the area address and therefore reduces the cost of NE setting.

Moreover, an NE can be connected on a plug-and-play basis, so facilities increase.

With the transmission apparatus according to the present invention, division points at which an area is to be divided are calculated on the basis of a predetermined condition. Transmission apparatus adjacent to one of the division points are selected as area group leaders. Each of the transmission apparatus selected as area group leaders changes its level so that data transmission can be performed between a new area formed as a result of division and the existing area. Data transmission between the new area and the existing area is performed via the transmission apparatus selected as area group leaders. By doing so, the area division is automatically made on the basis of the predetermined condition and the labor of a maintainer can be lessened.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A transmission apparatus for transmitting data in an area or between areas according to a level, the apparatus comprising:
    a division point calculation section to calculate division points where an area to which the transmission apparatus belongs is to be divided on the basis of a predetermined condition;
    an area group leader selection section to select transmission apparatus adjacent to one of the division points as area group leaders;
    a level change section for changing, in the case of being selected as the area group leader, the level so as to be able to transmit the data between a new area formed as a result of division and an existing area; and
    a data transmission section to transmit the data between the new area and the existing area via the transmission apparatus selected as the area group leaders.

2. A transmission apparatus for transmitting data in an area or between areas according to a level, the apparatus comprising:
    a network leader selection section to select a network leader in the area;

a division point calculation section to calculate, in the case of being selected as the network leader, division points where an area to which the transmission apparatus belongs is to be divided on the basis of a predetermined condition;

an area group leader selection section to select, in the case of being selected as the network leader, transmission apparatus adjacent to one of the division points as area group leaders;

a level change section to change, in the case of being selected as the area group leader, the level so as to be able to transmit the data between a new area formed as a result of division and an existing area; and a data transmission section to transmit the data between the new area and the existing area via the transmission apparatus selected as the area group leaders.

3. The transmission apparatus according to claim 2, further comprising a session continuation section to continue a session which has been established during the area division.

4. The transmission apparatus according to claim 2, wherein the predetermined condition is a traffic volume in the area.

5. The transmission apparatus according to claim 4, wherein the division point calculation section to calculate the division points so as to reduce the traffic volume.

6. The transmission apparatus according to claim 2, wherein the predetermined condition is a number of transmission apparatus in the area.

7. The transmission apparatus according to claim 6, wherein the division point calculation section to calculate the division points so as to make the number of transmission apparatus in the new area equal or roughly equal to the number of transmission apparatus in the existing area.

8. The transmission apparatus according to claim 2, further comprising an area address acquisition section to acquire, in the case of being newly connected in the area, an area address from a transmission apparatus connected thereto.

9. The transmission apparatus according to claim 2, further comprising a division point designation acceptance section to determine the division points in accordance with instructions from a management unit.

10. The transmission apparatus according to claim 2, wherein: priority is given to each transmission apparatus; and the network leader selection section to select the network leader on the basis of the priority.

11. The transmission apparatus according to claim 2, further comprising an address generation section to generate, in the case of being selected as the network leader, a new area address of the new area.

12. The transmission apparatus according to claim 11, further comprising an address sending section to send the new area address to a transmission apparatus in the new area.

13. An area division method for a transmission apparatus which transmits data in an area or between areas according to a level, the method comprising the steps of:

selecting a network leader in the area by a network leader selection section; calculating, in the case of being selected as the network leader, division points where an area to which the transmission apparatus belongs is to be divided by a division point calculation section on the basis of a predetermined condition;

selecting, in the case of being selected as the network leader, transmission apparatus adjacent to one of the division points as area group leaders by an area group leader selection section;

changing, in the case of being selected as the area group leader, the level by a level change section so as to be able to transmit the data between a new area formed as a result of division and an existing area; and transmitting the data between the new area and the existing area after division by a data transmission section via transmission apparatus selected as the area group leaders.

* * * * *